United States Patent [19]
Tokai et al.

[11] Patent Number: 5,839,310
[45] Date of Patent: Nov. 24, 1998

[54] PRESS BRAKE

[75] Inventors: Shigeru Tokai; Masaaki Takada, both of Ishikawa, Japan

[73] Assignee: Komatsu, Ltd., Tokyo, Japan

[21] Appl. No.: 702,697

[22] PCT Filed: Mar. 27, 1995

[86] PCT No.: PCT/JP95/00571

§ 371 Date: Sep. 12, 1996

§ 102(e) Date: Sep. 12, 1996

[87] PCT Pub. No.: WO95/26239

PCT Pub. Date: Oct. 5, 1995

[30] Foreign Application Priority Data

Mar. 29, 1994 [JP] Japan ................................. 6-059160

[51] Int. Cl.[6] ........................................................ B21D 5/02
[52] U.S. Cl. ........................ 72/31.1; 72/31.11; 72/389.3; 72/702
[58] Field of Search ................................. 72/31.1, 31.11, 72/389.3, 702

[56] References Cited

U.S. PATENT DOCUMENTS

| | | | |
|---|---|---|---|
| 4,430,879 | 2/1984 | Rolland | 72/389.3 |
| 4,864,509 | 9/1989 | Somerville et al. | 72/702 |
| 5,148,693 | 9/1992 | Sartorio et al. | 72/702 |
| 5,285,668 | 2/1994 | Tokai | 72/389.3 |
| 5,497,647 | 3/1996 | Nagakura | 72/389.3 |

FOREIGN PATENT DOCUMENTS

| | | | |
|---|---|---|---|
| 1-228612 | 9/1989 | Japan | |
| 228612 | 9/1989 | Japan | 72/702 |
| 3-90218 | 4/1991 | Japan | |
| 5-57353 | 3/1993 | Japan | |

*Primary Examiner*—David Jones
*Attorney, Agent, or Firm*—Nikaido Marmelstein Murray & Oram, LLP

[57] ABSTRACT

For starting bending of a workpiece, a provisional drive end for a ram is computed from information such as processing conditions for the workpiece input through a processing (condition input section and the relationship between the target bending angle for the workpiece and the springback angle of the workpiece stored in a springback data section. The ram is driven to the provisional drive end and then the bending angle of the workpiece is measured thereat by an angle measuring unit. Thereafter, a final drive end for the ram is obtained from (i) the measured bending angle, (ii) the relationship between the bending angle of the workpiece and the amount of driving the ram stored in a bending angle vs. driving amount data section, and (iii) the relationship between the target bending angle for the workpiece and the springback angle of the workpiece stored in a springback data section. The ram is driven to the final drive end thus obtained to complete the bending operation.

17 Claims, 17 Drawing Sheets

PRESS BRAKE

TECHNICAL FIELD

The present invention relates to a press brake for bending a workpiece with an upper die and a lower die that is arranged in opposing relationship with the upper die, and more particularly to a press brake designed to measure the bending angles of a workpiece during a bending process so as to achieve high-accuracy bending work.

BACKGROUND ART

In a known press brake for performing V-shaped bending with an upper die (i.e., punch) and lower die (i.e., die) which press a sheet-like workpiece held between them, the amount of driving either the upper or lower die is controlled by an NC device according to information on the material and thickness of a workpiece being processed and on die conditions. It is difficult for such a punch press to accurately control the driving amount because of variations in the thickness and/or properties of material of the workpiece processed. To solve this problem, it has been proposed to measure the bending angles of the workpiece during a bending process to provide a feedback for modifying a subsequent driving amount for either of the dies to be driven (hereinafter referred to as "movable die") so that increased accuracy can be ensured in bending operation. In this case, the angle of springback (return to an original shape due to resilience) of the workpiece varies depending on the material and thickness of the workpiece, die conditions and the like, and it is therefore necessary to measure the springback angle by in-line processing.

In this respect, there have been made many attempts to achieve accurate computation of a final driving amount for the movable die. One example is set out in Japanese Patent Laid-Open Publication No. 1-228612 (1989) in which the amount of springback necessary for determining a final drive end for the movable die is automatically measured for every workpiece and the final drive end is calculated based on the measured amount of springback, a target bending angle and an actual bending angle.

Japanese Patent Laid-Open Publication No. 3-71922 (1991) discloses another example in which the workpiece is unloaded after it has been bent to a provisional drive end and a final drive end is calculated from changes in the pressure exerted on the workpiece during the unloading process.

These publications both require complicated arrangements for controlling the movable die and therefore the ram. in order to make springback angle measurements and this results in an extended processing period and less productivity.

Accordingly, the invention has been made with the purpose of overcoming the foregoing drawbacks and one of the objects of the invention is therefore to provide a press brake capable of bending sheet-like workpieces with high accuracy in a short time.

DISCLOSURE OF THE INVENTION

We have studied extensively with a view to solving the problems described earlier and finally come to the invention with the founding in which the springback angles of workpieces do not vary so much between lots and can be estimated with high accuracy by utilizing classification according to the material and thickness of workpieces, etc.

In one aspect, the invention (the principle of which is illustrated in FIG. 1) aims to provide a press brake for bending a workpiece with an upper die and a lower die that is arranged in opposing relationship with the upper die, the press brake comprising:

(a) memory means 2 for storing information including (i) processing conditions for the workpiece, (ii) the relationship between the target bending angle for the workpiece and the springback angle of the workpiece and (iii) the relationship between the bending angle of the workpiece and the amount of driving either movable one 1 (hereinafter referred to as "movable di( 1") of the upper and lower dies;

(b) bending angle measuring means 3 for measuring the bending angles of the workpiece during a bending process;

(c) drive end computing means 4 for computing a provisional drive end for the movable die 1 based on the information stored in the memory means 2 and for computing a final drive end for the movable die 1 based on the bending angle of the workpiece measured at the provisional drive end by the bending angle measuring means 3 and on the information stored in the memory means 2; and (d) die driving means 5 for driving the movable die 1 to the final drive end after driving it to the provisional drive end.

In the invention according to the first aspect, when starting to bend a workpiece, a provisional drive end for either movable one of the upper and lower dies 1 (i.e., movable die 1) is computed based on information stored in the memory means 2, the information including processing conditions for the workpiece, the relationship between the target bending angle for the workpiece and the springback angle of the workpiece and the relationship between the driving amount for the movable die 1 and the bending angle of the workpiece. The movable die 1 is driven by the die driving means 5 until it reaches the provisional drive end at which the bending angle of the workpiece is measured by the bending angle measuring means 3. Then, a final drive end for the movable die 1 is obtained from the measured bending angle and the information preliminarily stored in the memory means 2. The movable die 1 is driven to the final drive end thus obtained thereby completing the bending operation. With this procedure, complicated control for the movable die 1 is no longer necessary and high-accuracy bending operation can be performed in a short time simply by carrying out angle measurement during a bending process.

According to a second aspect of the invention, there is provided a press brake for bending a workpiece with an upper die and a lower die that is arranged in opposing relationship with the upper die, the press brake comprising:

(a) memory means 2 for storing information including (i) processing conditions for the workpiece, (ii) the relationship between the target bending angle for the workpiece and the springback angle of the workpiece, (iii) the relationship between the bending angle of the workpiece and the amount of driving either movable one 1 of the upper and lower dies, (iv) a preset final drive end for the movable die 1, and (v) an angle measuring point indication value indicating how many degrees before a target drive angle the bending angle of the workpiece is to be measured at.

(b) bending angle measuring means 3 for measuring the bending angles of the workpiece during a bending process;

(c) drive end computing means 4 for computing the target drive angle based on the processing conditions for the workpiece and the relationship between the target bending angle for the workpiece and the springback angle of the workpiece, these pieces of information being stored in the memory means 2, computing a provisional drive end for the movable die 1 based on the target drive angle, the angle measuring point indication value, the preset final drive end and the relationship between the bending angle of the workpiece and the driving amount for the movable die 1, and computing a final drive end for the movable die 1 based on the bending angle of the workpiece measured at the provisional drive end by the bending angle measuring means 3, the relationship between the target bending angle for the workpiece and the springback angle of the workpiece and the relationship between the bending angle of the workpiece and the driving amount for the movable die 1; and (d) die driving means 5 for driving the movable die 1 to the final drive end after driving it to the provisional drive end.

In the invention according to the second aspect, when starting to bend a workpiece, a target drive angle is first computed based on processing conditions for the workpiece and the relationship between the target bending angle for the workpiece and the springback angle of the workpiece, these pieces of information being stored in the memory means 2. From this target drive angle and an angle measuring point indication value which indicates how many degrees before the target drive angle the bending angle of the workpiece is to be measured at, the bending angle of the workpiece at the angle measuring point is obtained. From this bending angle at the angle measuring point, a preset final drive end for the movable die 1 and the relationship between the bending angle of the workpiece and the driving amount for the movable die 1, a provisional drive end for the movable die (i.e., either the upper die or lower die) 1 is obtained. Then, the movable die 1 is driven to the provisional drive end by the die driving means 5 and at this position, the bending angle of the workpiece is measured by the bending angle measuring means 3. Thereafter, a final drive end for the movable die 1 is obtained from the measured bending angle, the relationship between the target bending angle for the workpiece and the springback angle of the workpiece and the relationship between the bending angle of the workpiece and the driving amount for the movable die 1, the data on these relationships being stored in the memory means 2. Finally, the movable die 1 is driven to the final drive end so that the bending operation is completed.

With the invention according to the second aspect, overbending of the workpiece at the position where the bending angle of the workpiece is measured can be avoided, and angle measurement can be made at a position closer to a target drive end, so that even when the relationship between the bending angle of the workpiece and the driving amount for the movable die 1 varies between material lots, errors in the calculation of the driving amount due to the variations in materials can be restricted, resulting in better bending accuracy. Thus, accurate bending operation can be performed in a short time without adopting complex control for the movable die 1.

Preferably, the invention according to the first and second aspects further includes springback data updating means for updating data on the relationship between the target bending angle for the workpiece and the springback angle of the workpiece according to actual measurement data obtained by measuring the bending angle of the workpiece by the bending angle measuring means 3. Also, it preferably includes bending angle vs. driving amount data updating means for updating data on the relationship between the bending angle of the workpiece and the driving amount for the movable die 1 according to actual measurement data obtained by measuring the bending angle of the workpiece by the bending angle measuring means 3. As the data on the relationship between the target bending angle for the workpiece and the springback angle of the workpiece and on the relationship between the bending angle of workpiece and the driving amount for the movable die 1 can be updated, the accuracy of the bending angle can be improved and a press brake having more applicability to various kinds of materials can be achieved.

In this case, the update data on the relationship between the bending angle of the workpiece and the driving amount for the movable die 1 can be calculated from an approximation which has been obtained directly from actual measurement data on the bending angle measured by the bending angle measuring means 3. Alternatively, it can be obtained through correction of an approximation already stored in the memory means 2, the correction value used herein being obtained from actual measurement data on the bending angle measured by the bending angle measuring means 3. With the latter method, the update data can be more easily obtained because a preliminary registered approximation can be utilized.

The provisional drive end for the movable die 1 may be a position where the movable die 1 comes in contact with the workpiece, and there may be provided a so-called teaching mode for allowing the die driving means 5 to be manually driven from the provisional drive end to the final drive end. With this teaching mode, the operator is allowed to operate the system while checking the bending condition of the workpiece, which enables bending of special types of material and consequently increases the applicability of the system.

Preferably, the bending angle measuring means 3 measures the bending angle of the workpiece for confirmation after completion of bending operation, and according to the confirmed bending accuracy, the final drive end for the movable die 1 can be adjusted. With this arrangement, the accurate value for the final drive end obtained through this adjustment can be utilized for the next bending operation, which eliminates the need for measurements of the bending angle from the next operation onward.

It is preferred for the invention according to the second aspect to have input means for inputting the angle measuring point indication value.

When a plurality of workpieces of the same shape in the same material lot or in different material lots having less variations in their properties are bent sequentially, the aforesaid preset final drive end may be the final drive end which has been determined in the preceding operation in cases where the bending operation involves a single step and may be the final drive end which has been determined in the same step in the preceding operation in cases where the bending operation involves a plurality of steps. When performing bending operation for the first time, the above preset final drive end may be calculated based on the processing conditions for the workpiece. When switching bending operation from one material lot to another material lot in cases where a plurality of workpieces of the same shape are sequentially bent, the preset final drive end may be the final drive end which has been determined in the last bending operation for the preceding material lot in cases where the bending operation involves a single step and may be the final drive end which has been determined in the same step of the last bending operation for the preceding material lot in cases where the bending operation involves a plurality of steps.

When performing bending operation for the first time or when changing bending operation from one material lot to another material lot in cases where a plurality of workpieces of the same shape are sequentially bent, the above-mentioned provisional drive end may be two positions, that is, a first provisional drive end and a second provisional drive end, and the above-mentioned angle measuring point indication values also takes two values, that is, a first angle measuring point indication value and a second angle measuring point indication value. This prevents over-bending even when bending operation is performed for the first time or when the material lot is changed, which leads to high-accuracy bending work. In this case, there may be provided input means for inputting the first and second angle measuring point indication values. In this case, the first provisional drive end may be calculated based on a preset final drive end while the second provisional drive end may be calculated based on the first provisional drive end.

It is preferable that the invention further include preset final drive end updating means for updating the preset final drive end, each time bending of a new workpiece starts in cases where a series of bending operations are performed on a plurality of workpieces having the same shape.

It is also preferable that the invention include number of bending angle measurements setting means for setting the number of bending angle measurements which are performed on a single workpiece during a bending process by the bending angle measuring means to two, one or zero. The provision of such means enables high-accuracy bending work with the minimum number of angle measurements, so that the productivity of the system can be improved.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

FIG. 1 is a diagram illustrating the principle of a press brake of the invention.

FIG. 2 is a diagram showing the structure of a system according to one embodiment.

Figure 3A:
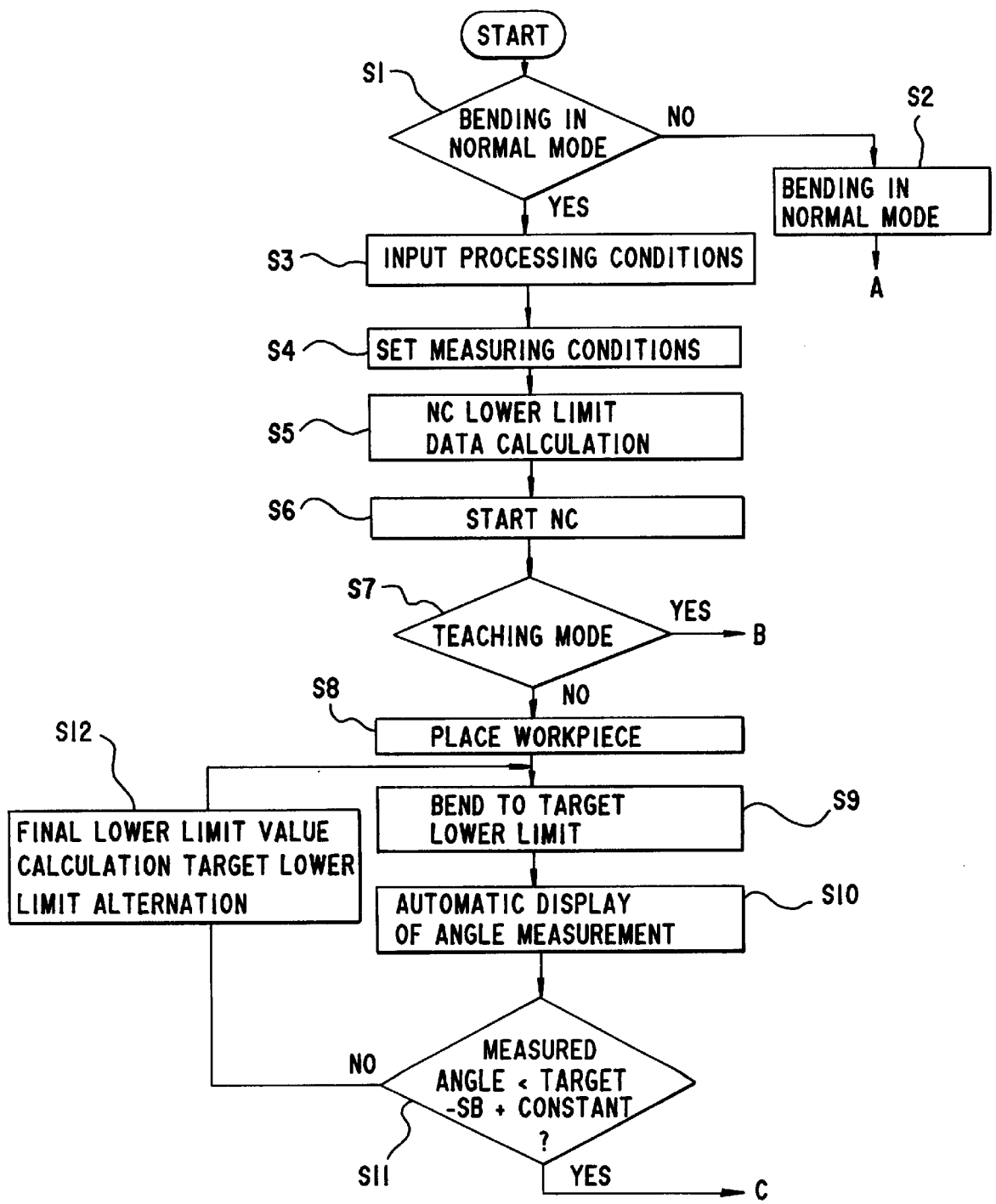
Figure 3B:
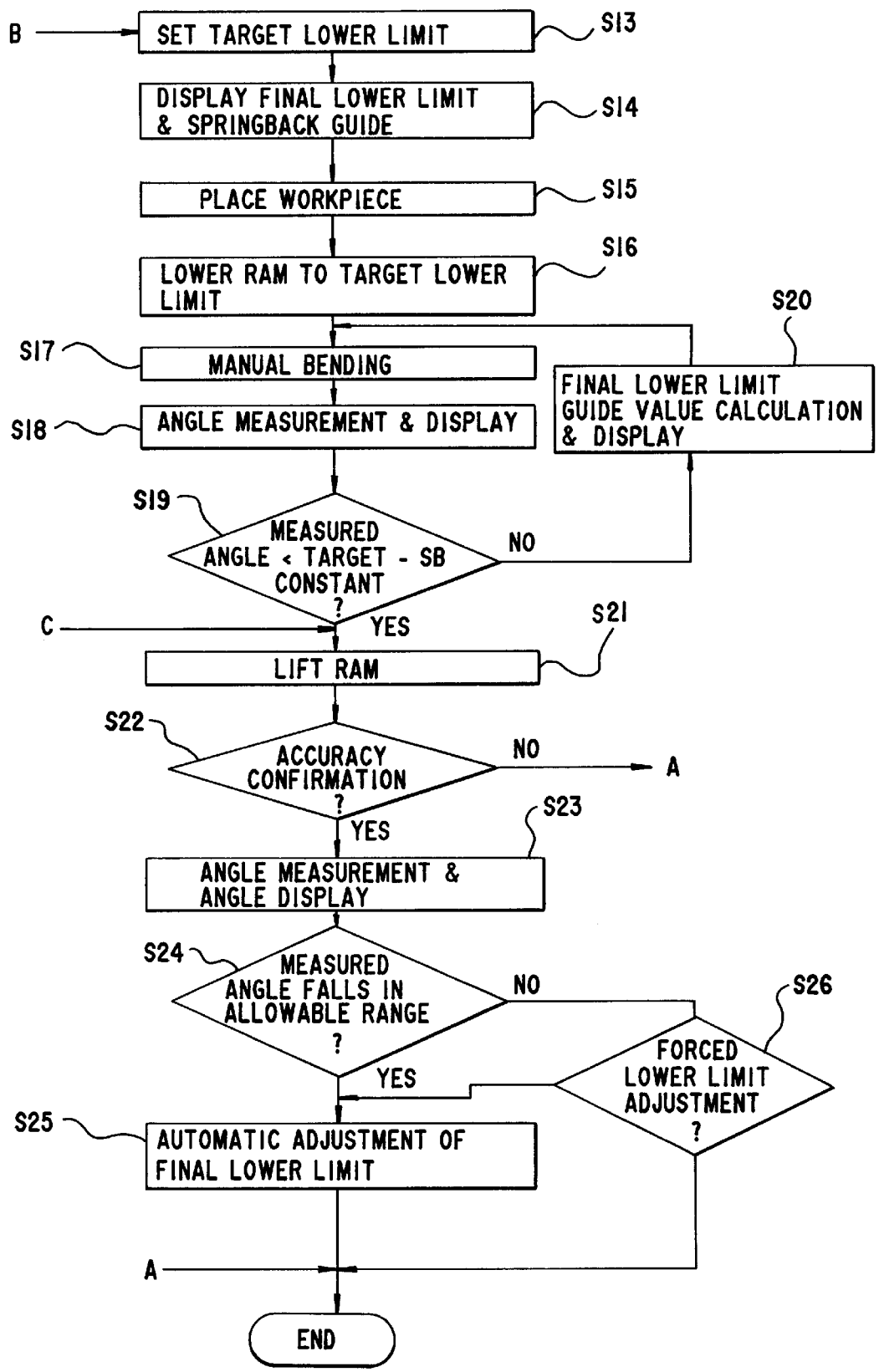

FIGS. 3/1 and 3/2 are flowcharts of bending operation according to one embodiment.

Figure 4A:
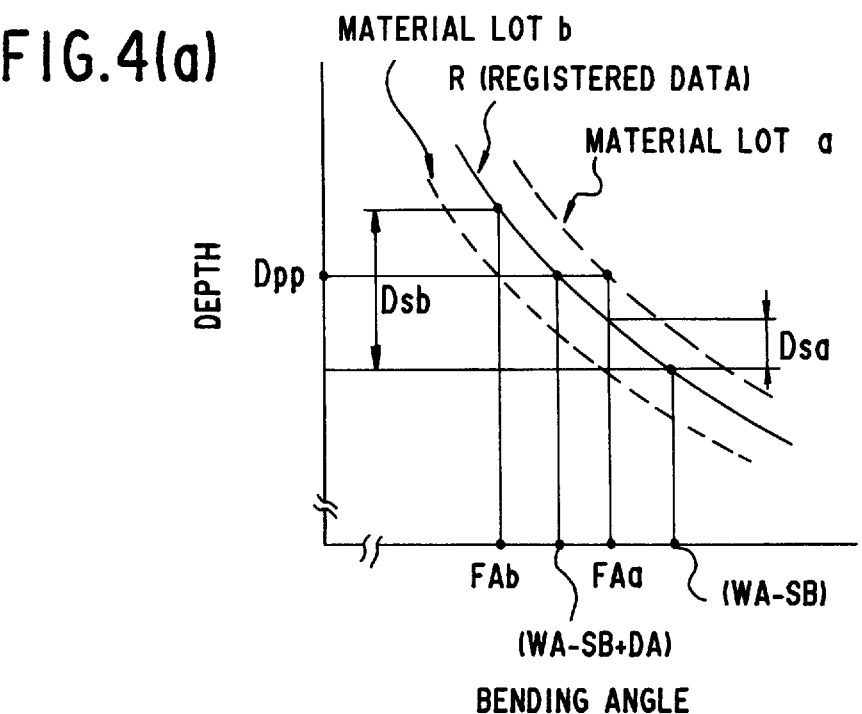
Figure 4B:
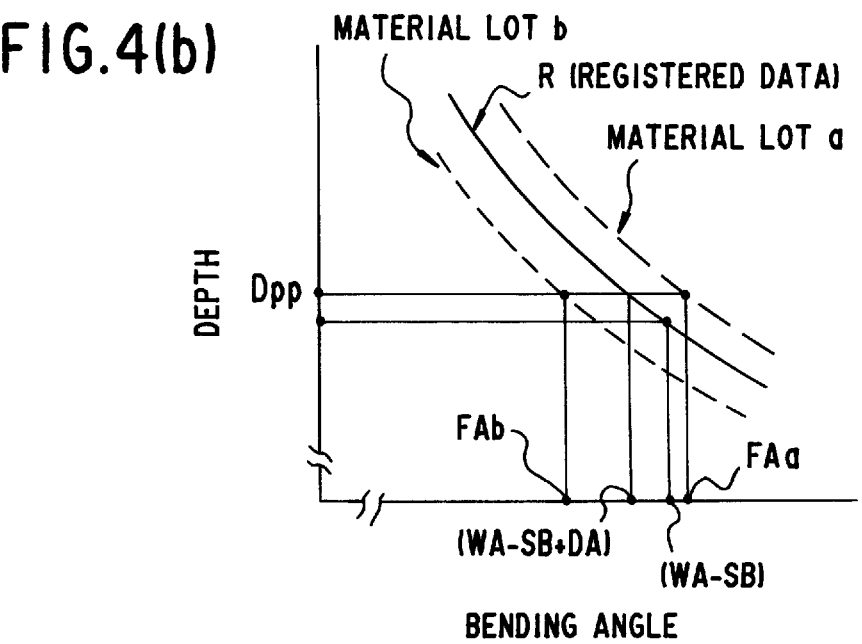

FIGS. 4(a) and 4(b) are graphs illustrating a problem in calculation of a provisional drive end.

Figure 5:
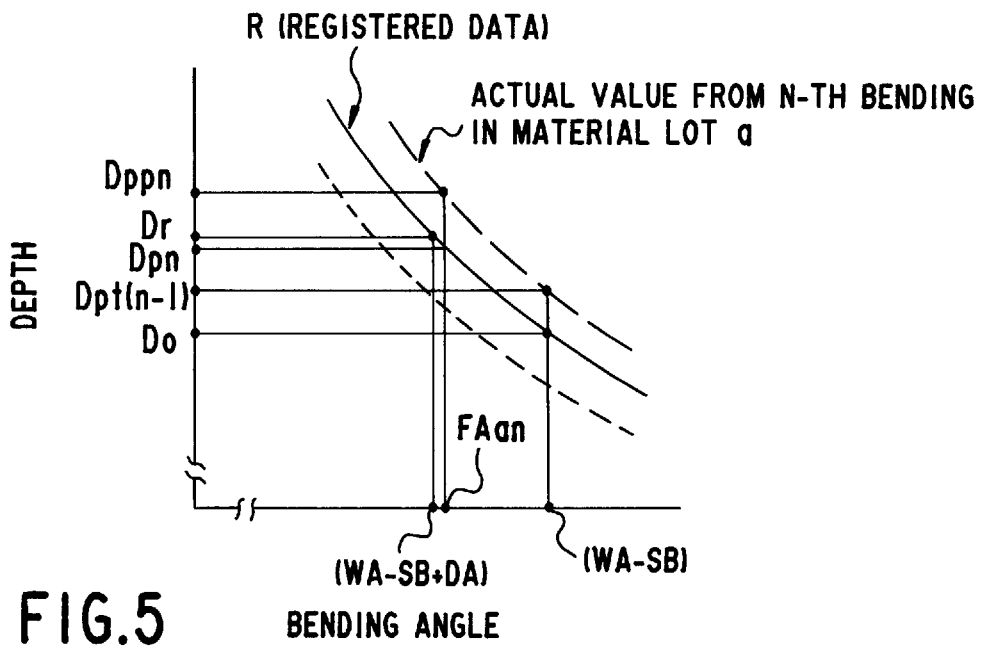

FIG. 5 is a graph (1) showing how to obtain a provisional drive end.

Figure 6:
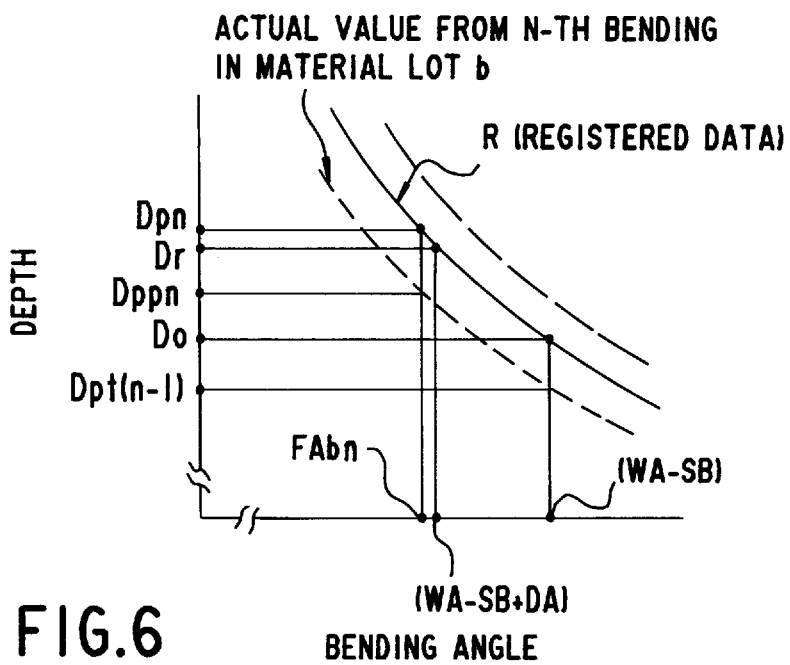

FIG. 6 is a graph (2) showing how to obtain a provisional drive end.

Figure 7:
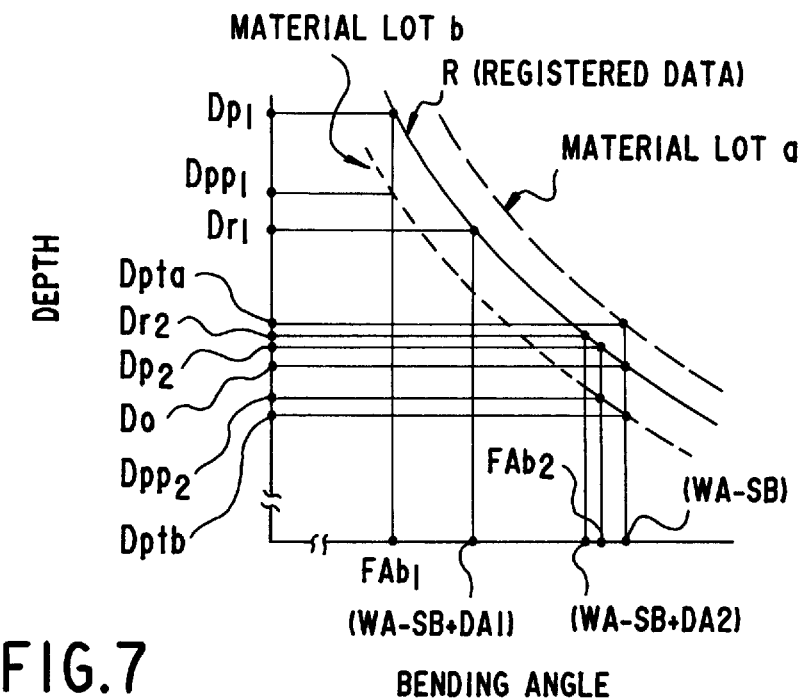

FIG. 7 is a graph (3) showing how to obtain a provisional drive end.

Figure 8:
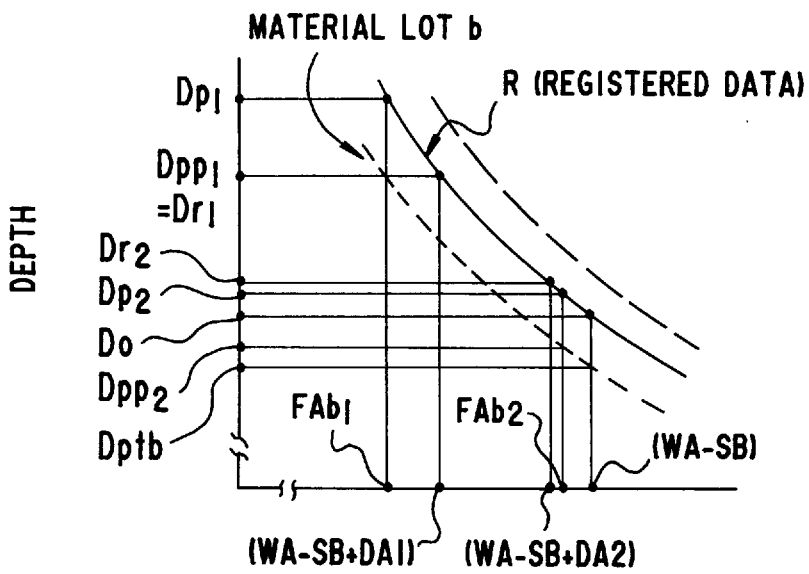
Figure 9A:
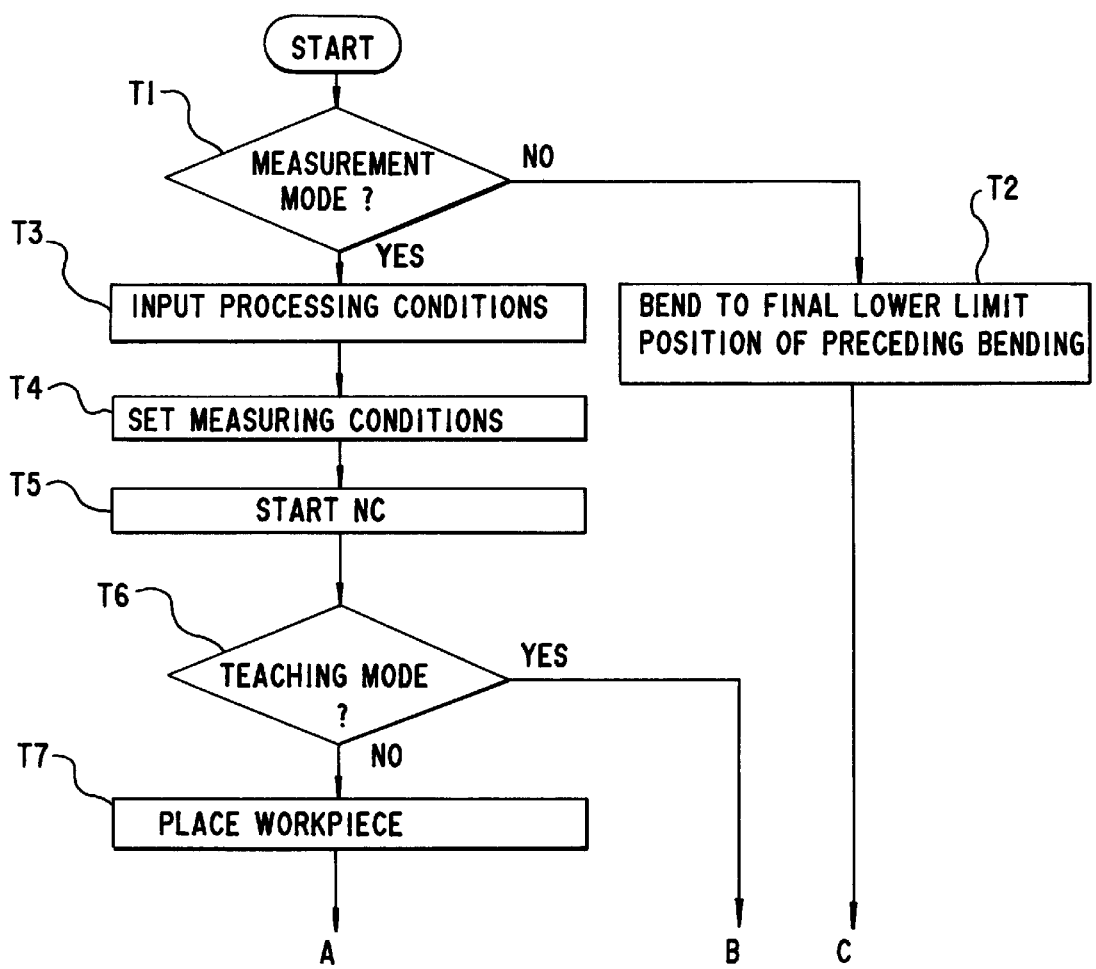
Figure 9B:
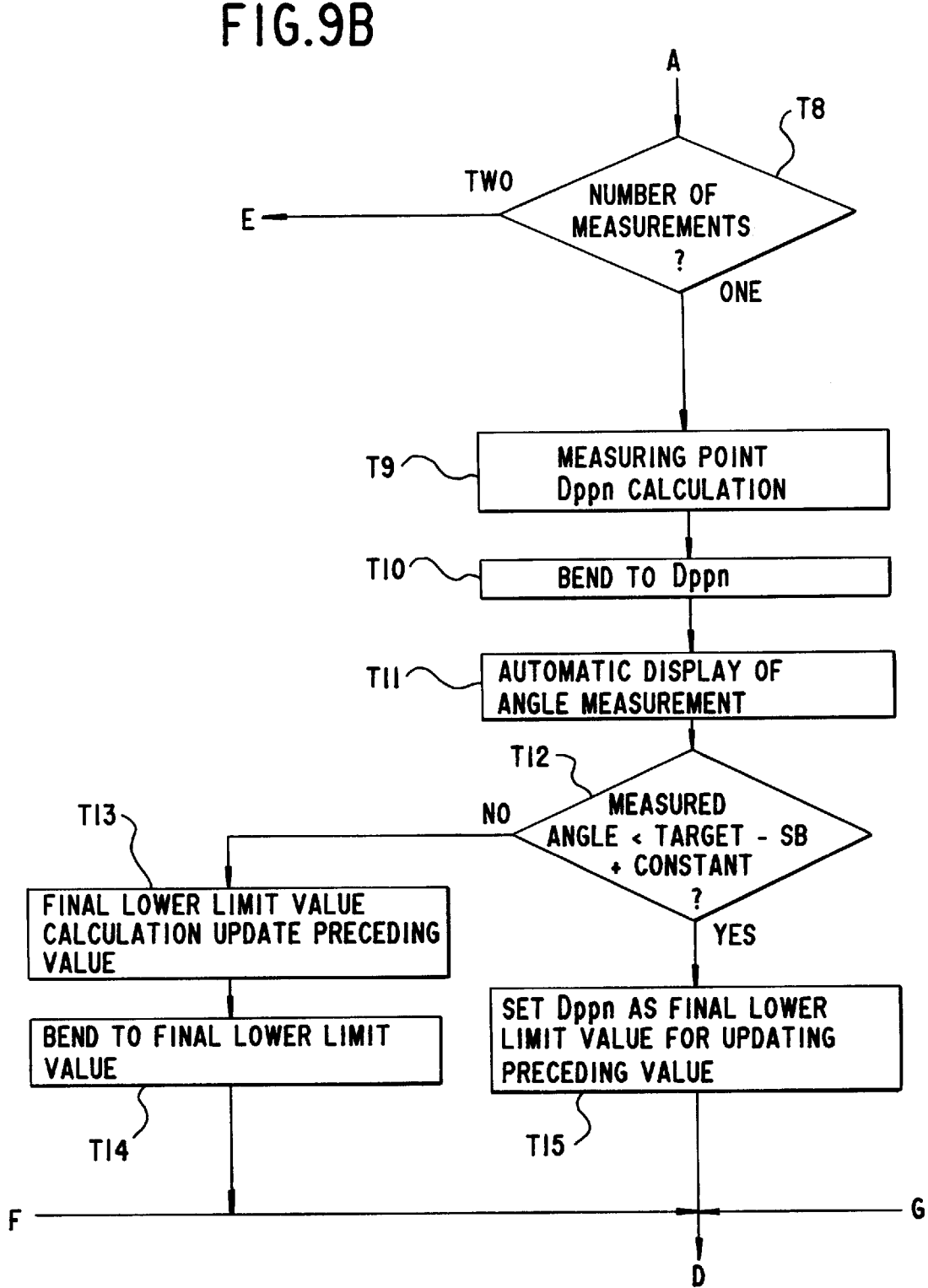
Figure 9C:
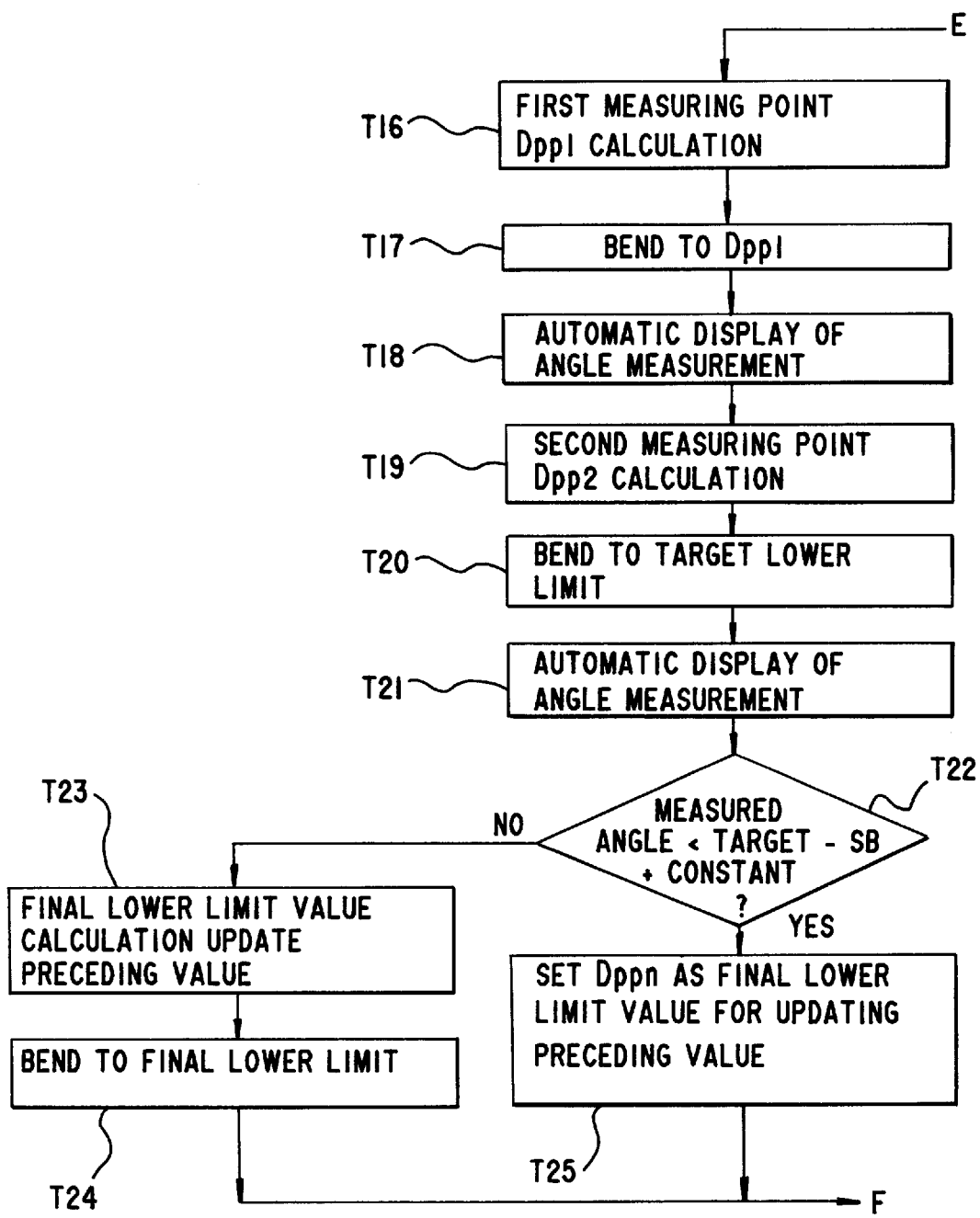
Figure 9D:
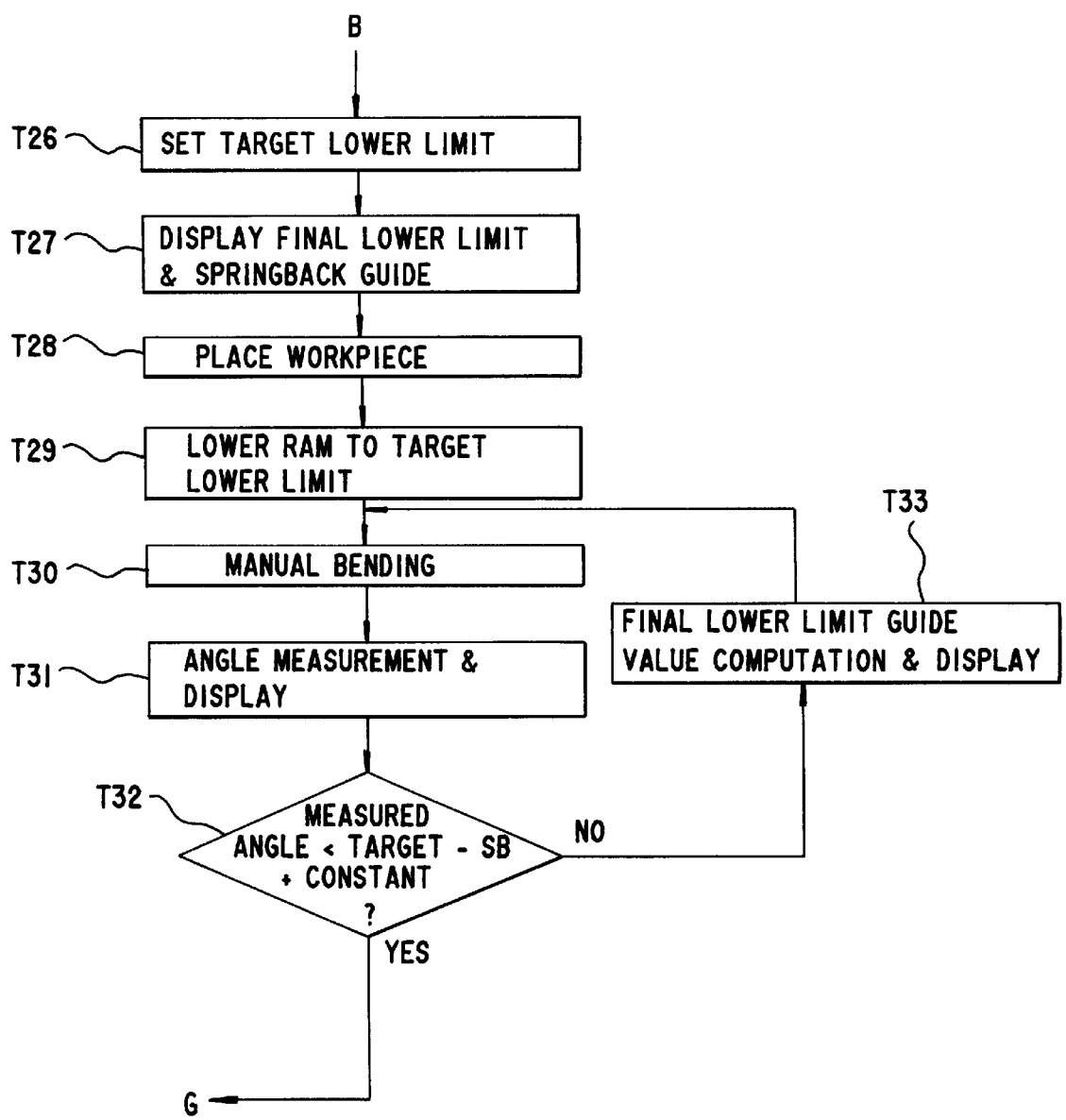
Figure 9E:
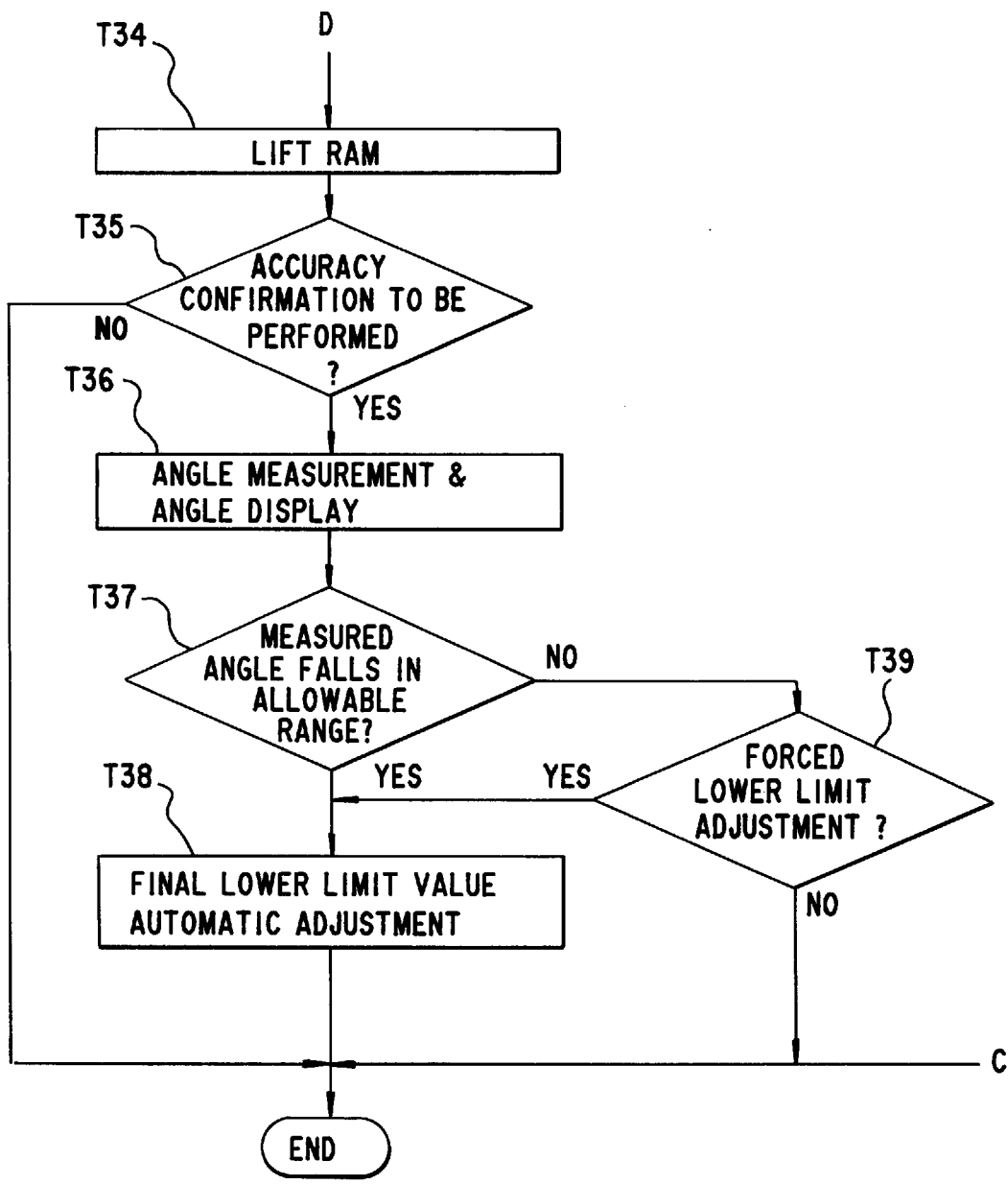

FIG. 8 is a graph (4) showing how to obtain a provisional drive end.

FIGS. 9/1 through 9/5 are flowcharts of bending operation according to another embodiment.

Figure 10:
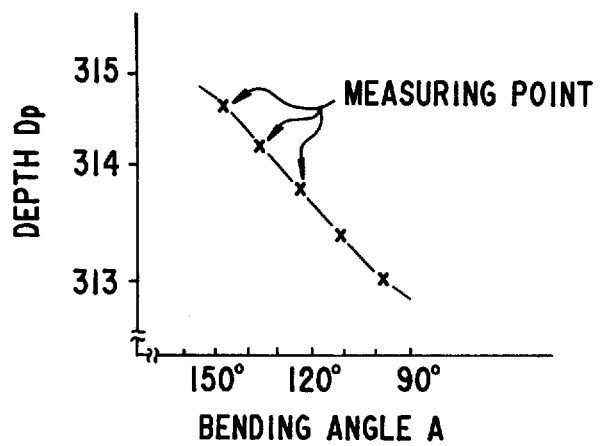

FIG. 10 is a graph illustrating the relationship between the bending angle of a workpiece and the depth.

Figure 11:
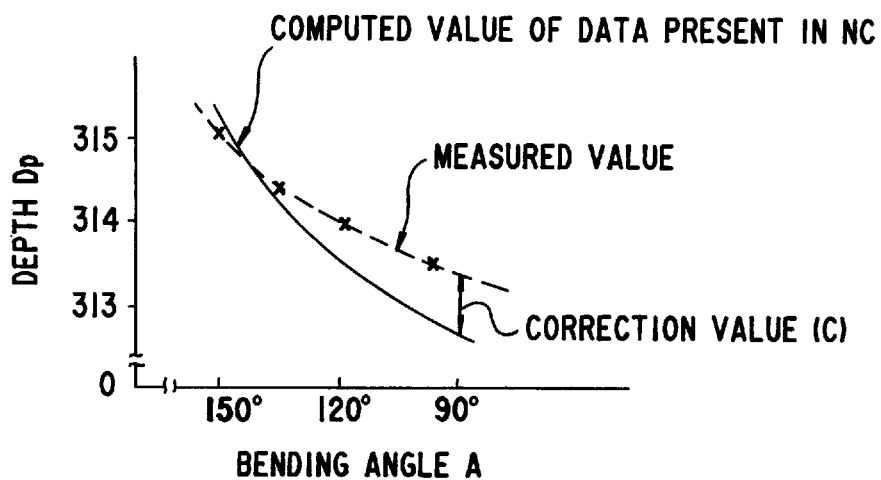

FIG. 11 is a graph illustrating the relationship between a preceding computed value and a measured value, which is used in the procedure of obtaining, through correction, the relationship between the bending angle of a workpiece and the depth.

Figure 12:
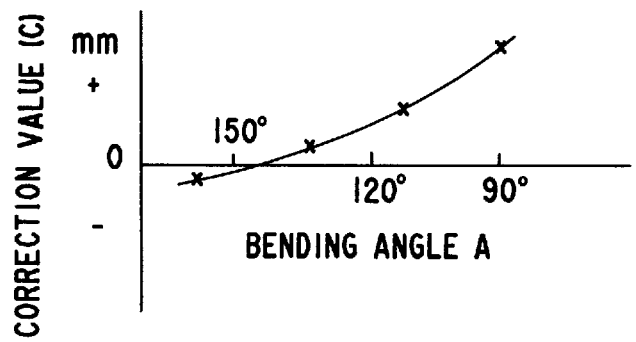

FIG. 12 is a graph illustrating the relationship between the bending angle of a workpiece and correction values, which is used in the procedure of obtaining, through correction, the relationship between the bending angle of a workpiece and the depth.

Figure 13:
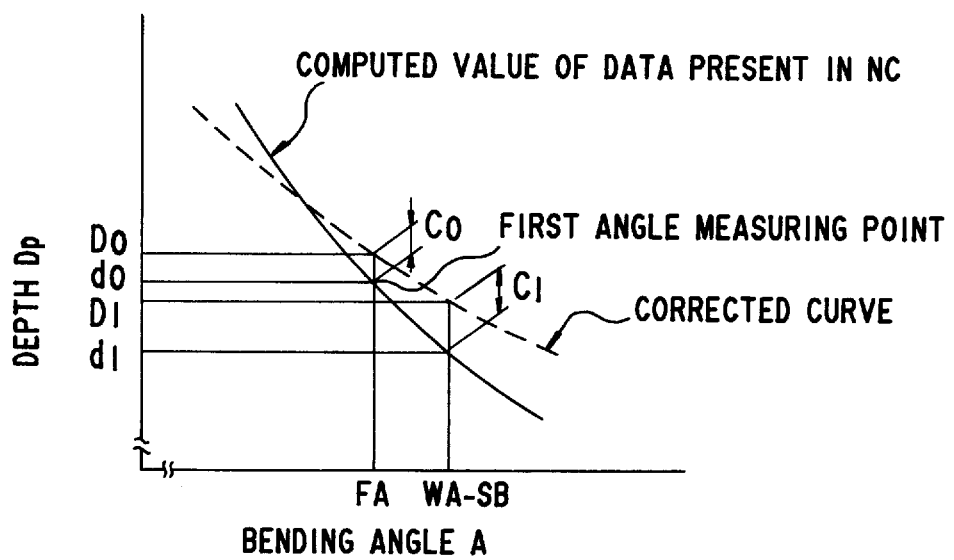

FIG. 13 is a graph illustrating a formula for obtaining a final lower limit value for a ram, which is used in the procedure of obtaining, through correction, the relationship between the bending angle of a workpiece and the depth.

Figure 14:
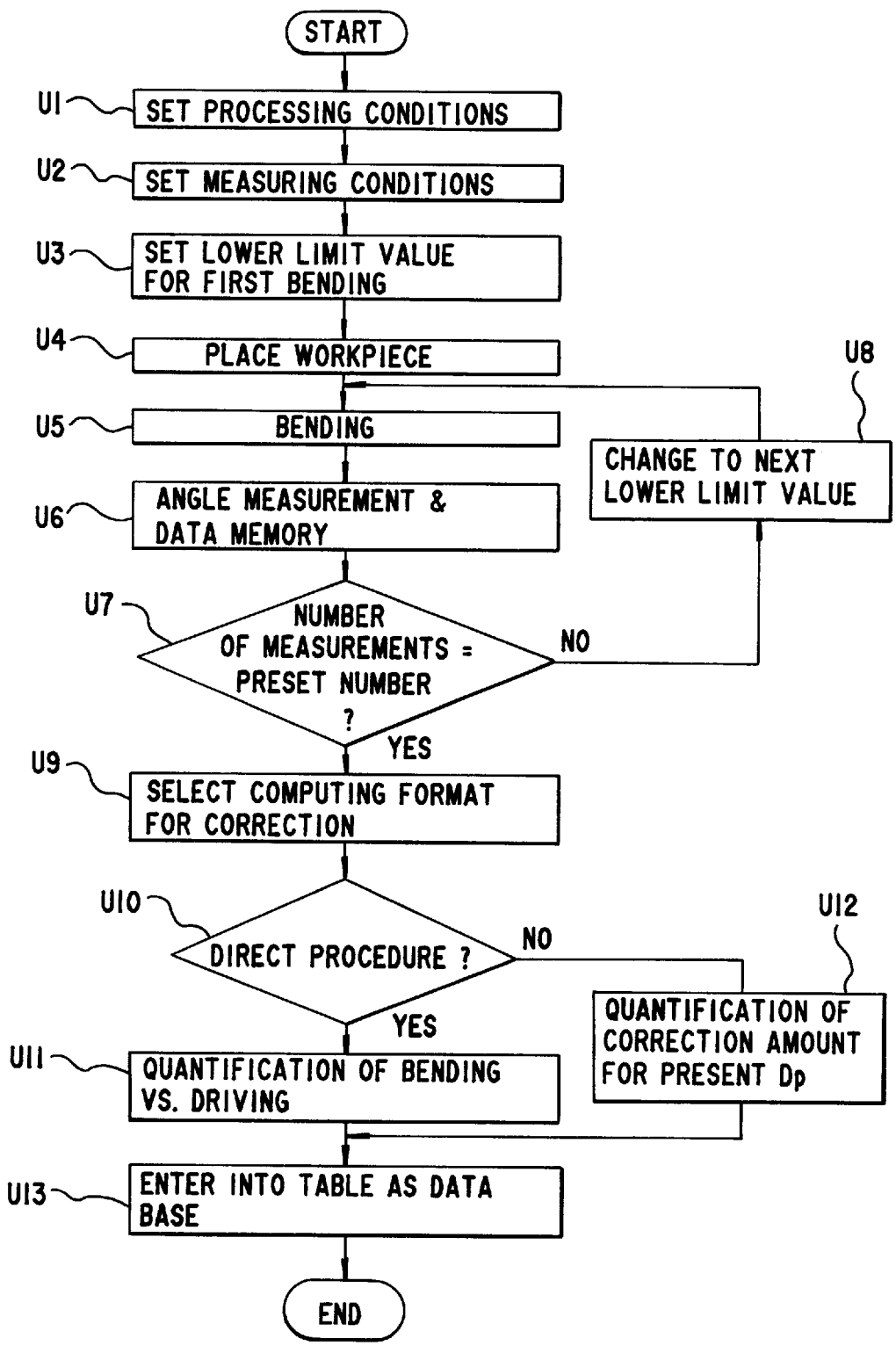

FIG. 14 is a flow chart of a process for updating bending angle vs. driving amount data.

Figure 15A:
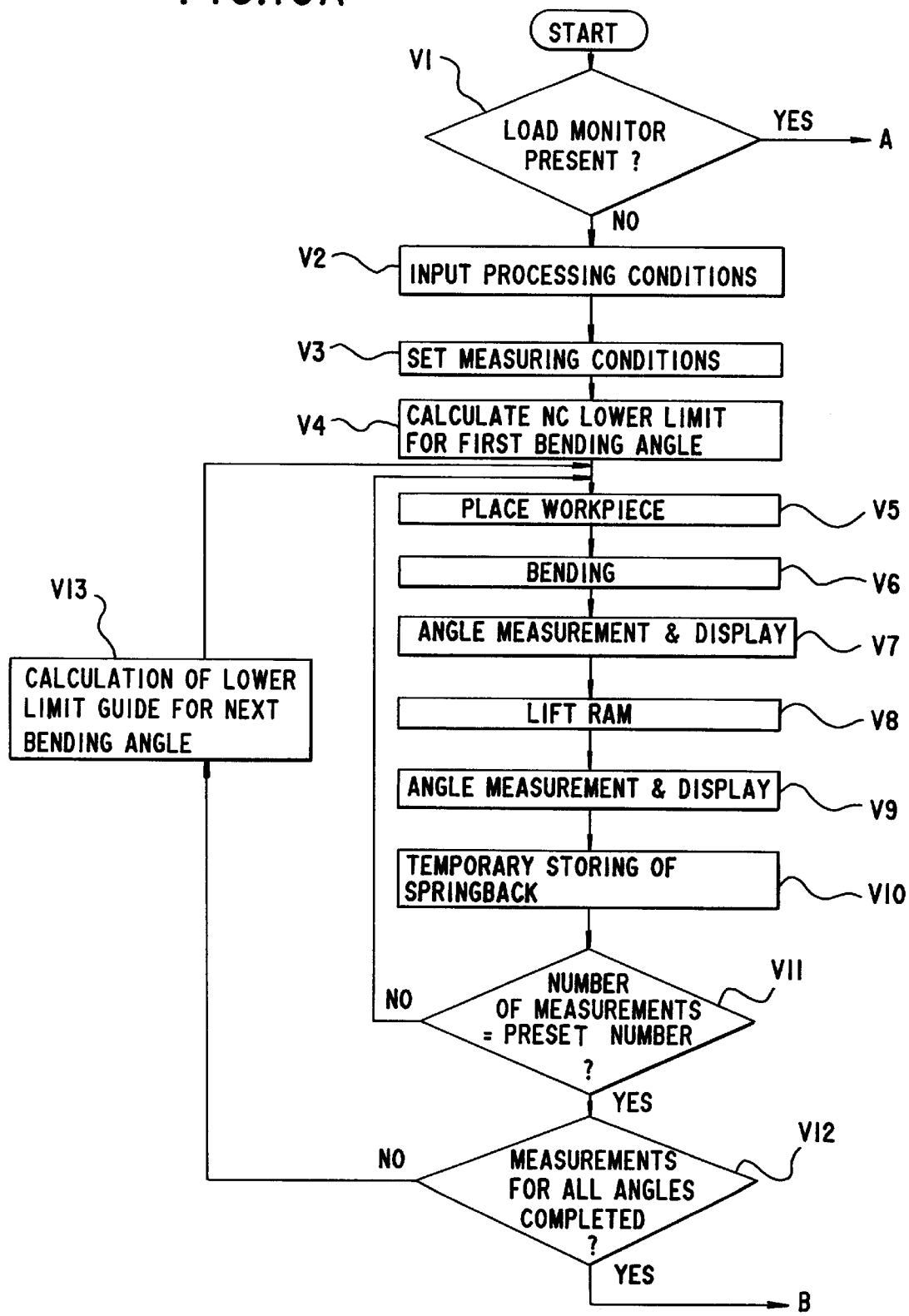
Figure 15B:
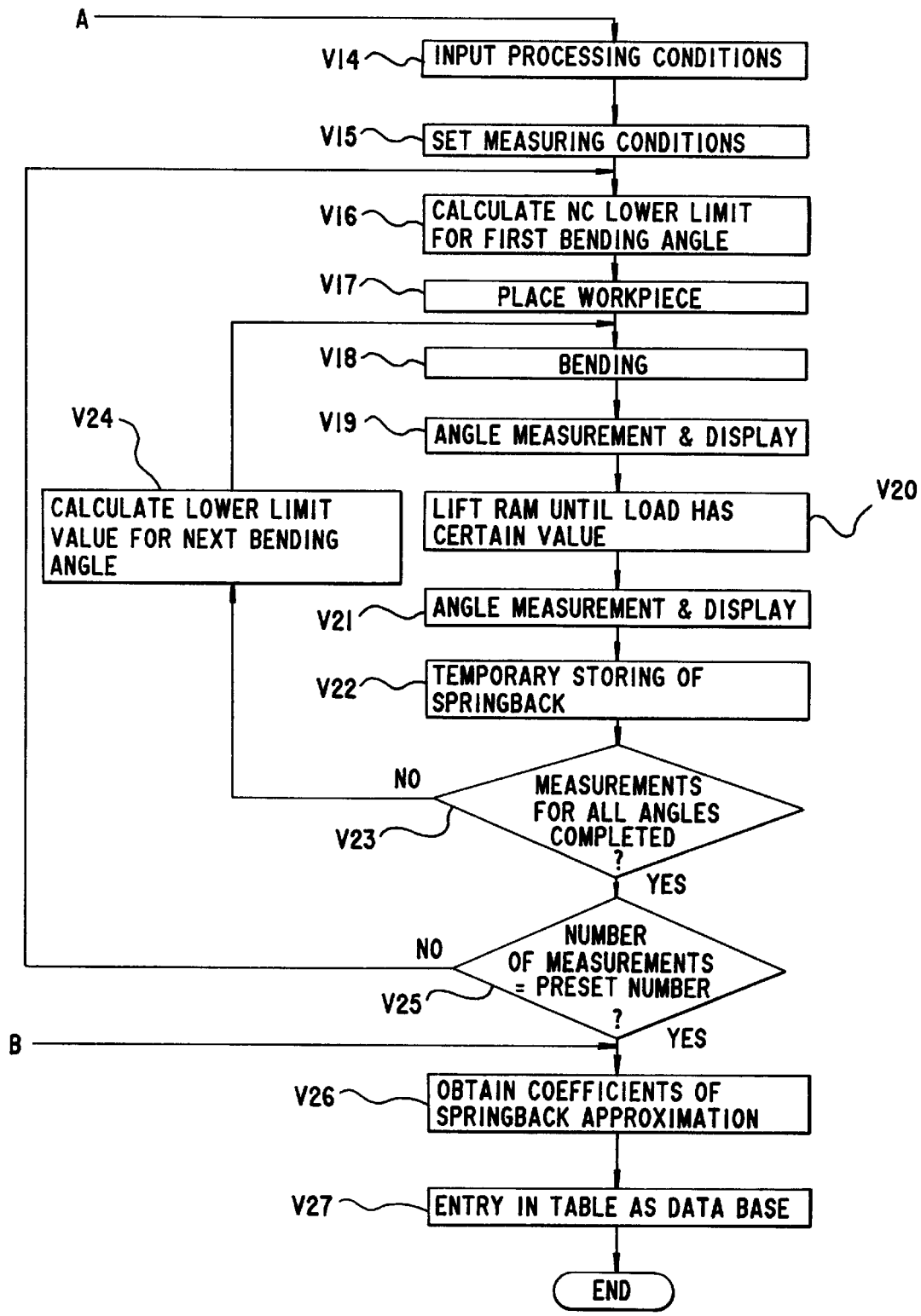

FIGS. 15/1 and 15/2 are flowcharts of a process for updating springback data.

BEST MODE FOR CARRYING OUT THE INVENTION

Referring now to the drawings, preferred embodiments of a press brake according to the invention will be described.

Figure 1:
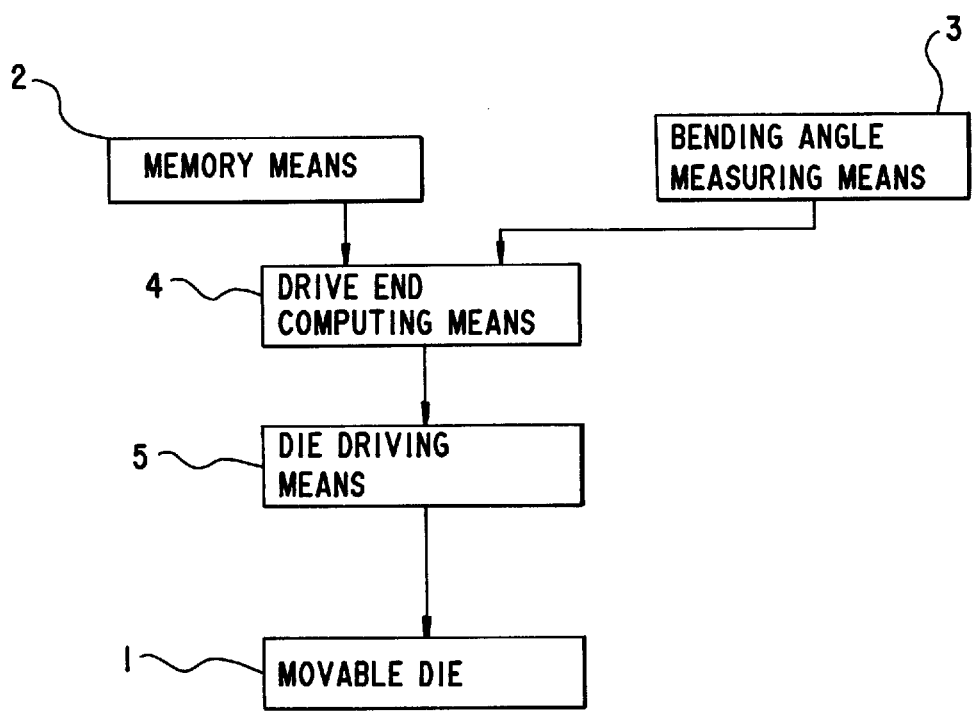
FIGS. 1 to 14 illustrate a press brake according to preferred embodiments of the invention.
Figure 2:
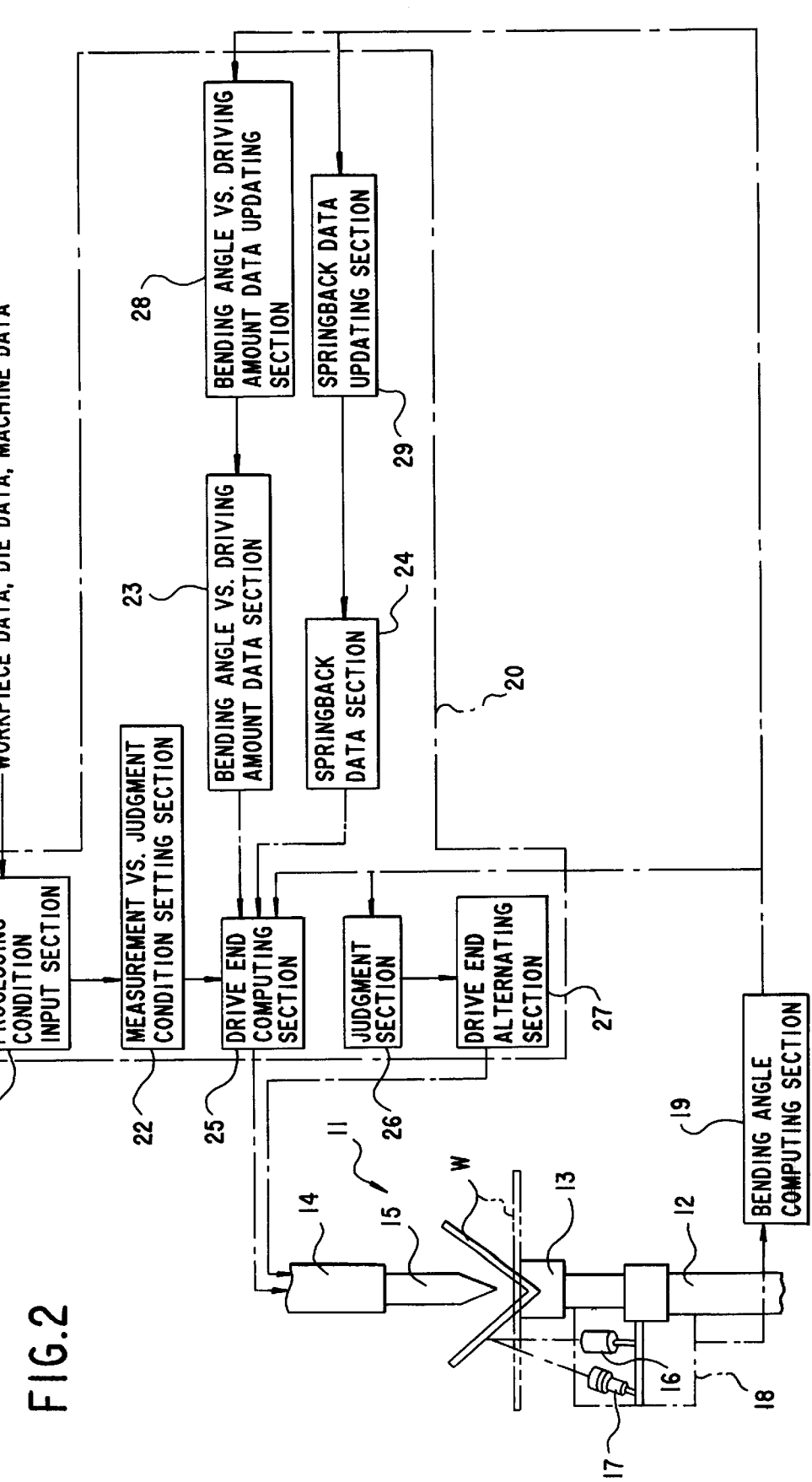

FIG. 2 shows the structure of a system according to one embodiment of the invention.

In this embodiment, a press brake 11 comprises a lower die (die) 13 supported on a mount 12 and an upper die (punch) 15 that is arranged in opposing relationship with the lower die 13, being attached to the underside of a ram 14. The ram 14 is so disposed as to be lifted and lowered above the lower die 13. Inserted between the lower die 13 and the upper die 15 is a workpiece W formed from a metal sheet. Bending of the workpiece W is performed in such a manner that the workpiece W is pressed by the lower die 13 and the upper die 15 by lowering the ram 14 with the workpiece W placed on the lower die 13.

On the front side (user side) of the mount 12, there are provided an angle measuring unit 18 which comprises a slit-shaped light source 16 for projecting a linear light image onto the outer faces of the bent workpiece W and a CCD camera 17 for picking up the linear light image formed by the light source 16. The angle measuring unit 18 measures the bending angle of the workpiece W. The angle measuring unit 18 may be positioned on the back (machine side) of the mount 12 instead of the front side of the same. Another alternative is such that two such angle measuring units 18 are provided on the front side and back of the mount 12 respectively thereby to measure the two outer faces of the bent workpiece W individually.

The image picked up by the CCD camera 17 is displayed on a monitor television (not shown) while it is processed as image data in a bending angle computing section 19. The bending angle computing section 19 computes the bending angle of the workpiece W and the result of this arithmetic operation is input in an NC device 20.

The NC device 20 comprises: (i) a processing condition input section 21 for inputting processing conditions such as workpiece data (material, the length of a bending line, bending angle, etc.), die data (die height, V-groove width, V-angle, punch R, etc.), and machine data (rigidity, speed specification, stroke specification, etc.); (ii) a measurement/judgment condition setting section 22 for setting, according to the processing conditions received from the processing condition input section 21, various conditions such as positions where the bending angle is to be measured during bending operation, measurement step No., tolerance, sampling conditions (e.g., number of times, angle) for use in updating of data bases and for setting conditions for judgment of the bending angle; (iii) a bending angle vs. driving amount data section 23 for storing data on the relationship between the bending angle and the driving amount for the ram 14; (iv) a springback data section 24 for storing data on the relationship between the target bending angle and the springback angle; (v) a drive end computing section 25 for computing a provisional drive end (lower limit position) for the ram 14 according to the data from the processing condition input section 21, and computing a final drive end for the ram 14 according to the data from the bending angle vs. driving amount data section 23 and from the springback data section 24 and according to the data from the processing condition input section 21 and from the bending angle computing section 19, and outputting drive signals to the ram 14 based on the results of these arithmetic operations; (vi) a judgment section 26 for judging the accuracy of the bending angle of the workpiece for which bending operation his been completed, according to the data from the bending angle computing section 19; (vii) a drive end alternating section 27 for alternating the drive end for the ram 14 according to a signal from the judgment section 26; (viii) a bending angle vs. driving amount data updating section 28 for temporarily storing data from the bending angle computing section 19 to enter new or update data in the bending angle vs. driving amount data section 23; and (ix) a springback data updating section 29 for temporarily storing data from the bending angle computing section 19 to enter new or update data in the springback data section 24 and for setting a computing format and performing arithmetic operation to obtain coefficients.

For starting bending of the workpiece W, first of all, the drive end computing section 25 computes a provisional drive end for the ram 14. This arithmetic operation is based on processing conditions (workpiece data, die data, machine data, etc.) received from the processing condition input section 21, on the relationship between the target bending angle for the workpiece W and the springback angle of the workpiece W which has been entered in the springback data section 24 and on the relationship between the bending angle of the workpiece W and the driving amount for the ram 14 which has been entered in the bending angle vs. driving amount data section 23. The ram 14 is then driven to the provisional drive end thus computed, thereby lowering the upper die 15. Thereafter, the bending angle of the workpiece W is measured at this provisional drive end by means of the angle measuring unit 18 and computed by the bending angle computing section 19. The amount of driving the ram 14 to this provisional drive end is obtained from the computed bending angle and the data on the relationship between the bending angle and the driving amount for the ram 14 which has been entered in the bending angle vs. driving amount data section 23. From the bending angle vs. driving amount data stored in the section 23 and the target bending angle vs. springback angle data stored in the springback data section 24, a final drive end for the ram 14 is obtained. Thereafter, the ram 14 is driven until it reaches the final drive end thus obtained to perform bending operation.

After the bending operation, the ram 14 is slightly lifted and bending angle measurement is taken again for confirmation of accuracy so that final automatic adjustment for the driving amount for the ram 14 is thus carried out. The value of the final driving amount obtained from the automatic adjustment, which assures satisfactory accuracy, can be utilized in the next bending operation, so that bending angle measurements are no longer necessary from the second bending operation onward.

The bending operation according to this embodiment is provided with a so-called teaching mode which allows the ram 14 to be manually lowered, for bending, from the point at which the upper die 15 is in contact with the workpiece W, pressurizing and holding it. With this teaching mode, the operator (an operate the system while checking the bending condition of the workpiece W. This lends the system to deal with special types of material and to have more applicability.

In this embodiment, the data on the relationship between the bending angle and the driving amount for the ram 14, which is stored in the bending angle vs. driving amount data section 23, is updated for the purpose of improving bending accuracy, by the bending angle vs. driving amount data updating section 28 according to actual measurement data on the bending angle sent from the bending angle computing section 19. In addition, the data stored in the springback data section 24 is updated by the springback data updating section 29 according to actual measurement data on the bending angle sent from the bending angle computing section 19. This arrangement allows a further improvement in bending accuracy and an increased applicability to a wide variety of materials.

Next, reference is made to the flow chart of FIG. 3 to describe the steps of the bending operation according to this embodiment.

S1 to S2: A check is made to judge whether the measurement mode for measuring the bending angle of the workpiece in the course of the operation is selected in the present bending operation. If the measurement mode is not selected (that means bending angle measurement will not be made), the ram 14 is then lowered to the final lower limit position, which has been set in the preceding bending operation, to bend the workpiece and the flow is ended (bending operation with the normal operation mode). Note that whether or not bending operation will be executed in the bending angle measurement mode is set by the operator through an external switch.

S3 to S6: If the measurement mode is selected, processing conditions such as workpiece data (material, the length of a bending line, bending angle, etc.), die data (die height, V-groove width, V-angle, punch R, etc.), and machine data (rigidity, speed specification, stroke specification, etc.) are input through the processing condition input section 21. Then, bending angle measuring conditions such as the lengthwise position and setting condition of the angle measuring unit 18 are set. From the processing conditions and the relationship between the target bending angle for the workpiece W and the springback angle stored in the springback data section 24, a provisional lower limit position (i.e., NC lower limit data) is obtained. Sequentially, the NC device 20 is put in operation.

S7 to S8: It is judged whether the teaching mode is selected, and if not, the workpiece W is then set in place.

S9 to S10: The upper die 15 is lowered to the provisional target lower limit position thereby performing bending operation. At this provisional target lower limit position, bending angle measurement is made by the angle measuring unit 18, while the result of the measurement is displayed.

S11 to S12: A check is made to judge whether the following relation holds.

measured angle<target bending angle−springback angle+constant
(e.g., the value of tolerance)

In other words, it is judged whether or not the target drive angle has been reached. If it is found that the target drive angle has not been reached, a final drive end (i.e., final lower limit value) for the ram 14 is then obtained from the measured bending angle, from the relationship between the bending angle and the driving amount for the ram 14 stored in the bending angle vs. driving amount data section 23 and from the relationship between the target bending angle for the workpiece W and the springback angle stored in the springback data section 24, in order to change the target lower limit value. Thereafter, the flow goes back to the step S9 to continue the bending operation. On the other hand, if the target drive angle has been reached, the flow proceeds to the step S21.

S13 to S18: In the case of the teaching mode, a target lower limit position (i.e., the position where the tip of the upper die 15 touches the workpiece W) is determined from the processing conditions. Then, a final lower limit position for the ram 14 and a guide value for the springback angle are obtained from the processing conditions and from the relationship between the target bending angle for the workpiece W and the springback angle stored in the springback data section 24, in order to display a limit value for manual bending operation (to be described later). Thereafter, the workpiece W is placed between the upper die 15 and the lower die 13 and the upper die 15 is lowered to the target lower limit position to hold and pressurize the workpiece W between the upper die 15 and the lower die 13. With the pressurizing switch turned on, the pulse generator is manually rotated, thereby lowering the ram 14 to bend the workpiece W while angle measurement is carried out to display measured values.

S19 to S20: A check is made to find whether or not the relationship "measured angle<target bending angle−springback angle+constant" holds. If not (i.e., the target drive angle has not been reached), a guide value for the final drive end (final lower limit value) for the ram 14 is obtained for displaying and the flow sequentially goes back to S17 to continue the bending operation. On the other hand, if the target drive angle has been reached, the flow proceeds to S21.

S21 to S23: The ram 14 is lifted and a check is then made to determine whether the bending accuracy will be confirmed. If it is determined that bending accuracy confirmation will not be carried out, the flow is ended. If the confirmation is decided to be carried out, a measured value of the bending angle is then displayed. In this case, bending angle measurement is preferably carried out with the workpiece W slightly clamped, in case the workpiece W fall down as the ram 14 rises, obstructing the measurement.

S24 to S26: A check is made to judge whether the measured angle falls within an allowable range, and if so, the final lower limit value is then automatically adjusted and the flow is completed. On the other hand, if the measured value is out of the allowable range, which means the bending operation resulted in a failure, it is then determined whether forcible lower limit adjustment is to be carried out. If so, the flow proceeds to the step S25 to automatically adjust the final lower limit value. If not, the flow is ended without adjustment.

A provisional drive end (i.e., provisional target lower limit position) for the ram 14 has not been concretely discussed in the description of the bending operation in conjunction with the flow chart of FIG. 3. Now, there will be given a detailed explanation on how to obtain a provisional drive end for the ram 14.

First, reference is made to FIGS. 4(a) and 4(b) for explaining the problem in obtaining a provisional target lower limit position through calculation based on preliminarily entered data on the relationship between the bending angle of the workpiece and the driving amount for the movable die. In FIG. 4, the bending angle of the workpiece W is plotted on the abscissa while depth (i.e, the distance from the reference surface of the lower die 13 to the ram 14) which corresponds to a drive end for the ram 14 is plotted on the ordinate. The bending angle decreases as it proceeds in the positive direction (to the right) (this rule is also applied to FIGS. 5 to 8).

Referring to FIG. 4(a), where a target drive angle is represented by WA−SB (WA=target bending angle SB=springback angle) and an angle measuring point indication value, which indicates how many degrees before the target bending angle WA−SB the bending angle of the workpiece W is to be measured at, is represented by DA, the bending angle at this angle measuring point is described by WA−SB+DA and the depth corresponding to the angle WA−SB+DA is given by $D_{pp}$. The relationship between the bending angle of the workpiece and the depth varies significantly between material lots so that registered data line R deviates from the lines representing material lots a and b, respectively. Therefore, when $D_{pp}$ is obtained as the depth corresponding to the angle WA−SB+DA in the registered data R, the measured bending angle corresponding to $D_{pp}$ in bending of the material lot a is $FA_a$ and the measured bending angle corresponding to the same in bending of the material lot b is $FA_b$. For the material lot a, the amount for additionally driving from the measured angle $FA_a$ to the target drive angle WA−SB is $D_{sa}$. For the material lot b, the amount for additionally driving from the measured angle $FA_b$ to the target drive angle WA−SB is $D_{sb}$. In these cases, the additional driving amounts $D_{sa}$ and $D_{sb}$ are calculated based on the registered data R, and therefore there exist differences between these calculated values and values obtained from actual bending. When taking into the errors into account, bending accuracy increases as the additional driving amount decreases. Accordingly, it is desired to measure the bending angle with a smaller angle measuring point indication value DA at a position as close to the target drive angle WA−SB as possible.

As shown in FIG. 4(b), to reduce the angle measuring point indication value makes the measured angle $FA_a$ smaller than the target drive angle WA−SB at the measuring point, resulting in over-bending in the case of the material lot a. In the case of the material lot b, even if the angle measuring point indication value DA is made small, the measured angle $FA_b$ is still far from the target drive angle WA−SB, which cannot meet accuracy requirements.

To solve the above problem, this embodiment is designed to take two different ways in obtaining a provisional target lower limit position for the ram 14 (i.e., bending angle measuring position) according to the following cases: (1) where a plurality of workpieces of the same shape in the same material lot or in different material lots having less variations in their properties are bent sequentially; and (2) where bending operation is performed for the first time, or switched from one material lot to another in cases where a plurality of workpieces of the same shape are sequentially bent.

(1) Where a plurality of workpieces of the same shape in the same material lot or in different material lots having less variations in their properties are bent sequentially (see FIG. 5):

In this case, as the variation in materials is small even though the actual data on the material lots differ from the registered data, the angle measuring point for the present operation can be obtained from the final drive end which has been determined in the preceding operation in cases where the bending operation involves a single step or which has been determined in the same step in the preceding operation in cases where the bending operation involves a plurality of steps. This makes possible bending angle measurement at a position closer to the target drive angle WA–SB.

The above process will be more concretely described by way of an example. In an n-th bending operation for the material lot a, the depth $D_{ppn}$ for an n-th angle measuring point is calculated, using the following equation. Note that a preset value has been entered in the memory means through an input means, as the angle measuring point indication value DA.

$$D_{ppn} = D_{pt(n-1)} + (D_r - D_0) \quad (a)$$

Here, $D_{pt(n-1)}$ is the final depth in the (n−1)th bending operation; $D_r$ is the depth for (WA–SB+DA) in the registered data; and $D_0$ is the depth for (WA–SB) in the registered data.

Then, the ram 14 is driven to the angle measuring point obtained by the above equation where bending angle measurement is carried out with the angle measuring unit 18. With the measured angle $FA_{an}$ (i.e., the n-th measured angle) obtained at that time, the final depth $D_{ptn}$ is obtained from the following equation (b). Thereafter, the ram 14 is driven to the drive end corresponding to the final depth $D_{ptn}$ and the bending operation is completed.

$$D_{ptn} = D_{ppn} - (D_{pn} - D_0) \quad (b)$$

Here, $D_{pn}$ is the depth for the measured angle $FA_{an}$ in the registered data.

In this way, the measured angle $FA_{an}$ can be made closer to the angle WA–SB+DA, and the bending angle can be measured at a position close to the target drive angle WA–SB by entering a small value as the angle measuring point indication value DA. This leads to an improvement in bending accuracy. Since the angle measuring point for the present operation can be obtained from the final depth which has been updated through bending angle measurement in the preceding operation, even if the main body of the press brake expands or contracts with time on account of heat generation, which causes gradual deviation in the relationship between the depth and the bending angle, the bending angle of the workpiece can be measured at a position close to the target drive angle WA–SB without being affected by the deviation in the above relationship.

FIG. 6 shows one example of bending operation performed on the material lot b. As seen from this figure, it is possible to make the measured angle $FA_{bn}$ of the material lot b closer to the angle WA–SB+DA, similarly to the case of the material lot a. While the above description is based on a case where bending operation is sequentially performed within the same material lot, the depth $D_{pp}$ for the angle measuring point and the final depth $DP_{ptn}$ can be obtained in the similar way in cases where bending operation is performed on different material lots having less variations in properties.

(2) Where bending operation is performed for the first time or where bending operation is switched from one material lot to another in cases where a plurality of workpieces of the same shape are sequentially bent (see FIG. 7):

When switching bending operation from one material lot to another in cases a plurality of workpieces of the same shape are sequentially bent, the relationship between the bending angle and the depth significantly fluctuates between the preceding and present operations. When starting bending operation for the fist time, the angle measuring point must be obtained from calculation based on the registered data R as there is no previously measured value to be utilized. In these cases, over-bending similar to that appearing in the case shown in FIG. 4(b) is likely to occur, and therefore bending angle measurement is carried out twice in one bending operation. Specifically, a first angle measurement is done at a sufficient distance from the target drive angle WA–SB and a second angle measurement is done at a position closer to the target drive angle WA–SB with the measured value obtained from the first measurement.

In the case where bending operation is switched from the material lot a to the material lot b for example, a depth $D_{pp1}$ for the first angle measuring point is obtained from the following equation (c). Note that specified values have been preliminarily entered in the memory means through the input means, as angle measuring point indication values DA1 and DA2.

$$D_{pp1} = D_{pta} + (D_{r1} - D_0) \quad (c)$$

Here, $D_{pta}$ is the final depth in the bending operation for the material lot a; $D_{r1}$ is the depth for (WA–SB+DA1) in the registered data; and $D_0$ is the depth for (WA–SB) in the registered data.

Then, the ram 14 is driven to the first angle measuring point obtained from the above equation to carry out bending angle measurement by the angle measuring unit 18. With the measured angle $FA_{b1}$ obtained at that time, the depth $D_{pp2}$ for the second angle measuring point is obtained from the following equation (d). The ram 14 is then driven to the drive end corresponding to the depth $D_{pp2}$.

$$D_{pp2} = D_{pp1} - (D_{p1} - D_{r2}) \quad (d)$$

Here, $D_{p1}$ is the depth for the measured angle $FA_{b1}$ in the registered data and $D_{r2}$ is the depth for (WA–SB+DA2) in the registered data.

Thereafter, bending angle measurement is again carried out at the second angle measuring point. With the measured angle $FA_{b2}$ obtained in the second measurement, the final depth $D_{ptb}$ (for the material lot b) is obtained from the following equation (e). The ram 14 is then driven to the drive end corresponding to the final depth $D_{ptb}$, and the bending operation is completed.

$$D_{ppb} = D_{pp2} - (D_{p2} - D_0) \quad (e)$$

Here, $D_{p2}$ is the depth for the measured angle $FA_{b2}$ in the registered data.

A comparatively large value is preset for the angle measuring 29 point indication value DA1 to avoid over-bending while a comparatively small value is preset for the angle measuring point indication value DA2 to improve accuracy. This allows the second angle measurement to be made at a position close to the target drive angle WA–SB, improving bending accuracy. Since bending angle measurement is made twice, the time taken for the bending operation in this case is inevitably longer than the case where the bending angle is measured once.

FIG. 8 shows the case where bending of the first workpiece in the material lot b is performed. When performing bending operation for the first time, there is no final depth based on the previous bending angle measurement and therefore the final depth calculated based on the registered data R is utilized in obtaining the depth $D_{pp1}$ for the first measuring point from the following equation (f).

$$D_{pp1} = D_0 + (D_{r1} - D_0) \qquad (f)$$

After the depth $D_{pp1}$ for the first measuring point has been thus determined, the depth $D_{pp2}$ for the second measuring point and the final depth $D_{ptb}$ are determined similarly from the following equations (g), (h) respectively.

$$D_{pp2} = D_{pp1} - (D_{pp1} - D_{r2}) \qquad (g)$$

$$D_{ptb} = D_{pp2} - (D_{p2} - D_0) \qquad (h)$$

Whether the above-described angle measurement will be made twice, once or zero time (i.e., no measurement) can be set as desired by the user through the number of bending angle measurements setting means (e.g., dial or switch). This arrangement allows the user to select "one measurement" for operation in which importance is given to productivity, for example, when workpieces in the same material lot are sequentially bent, and to select "two measurements" for operation in which high-accuracy is required without over-bending, for example, when bending operation is performed for the first time.

The press brake according to this embodiment may be designed to perform bending angle measurement at specific intervals according to a predetermined schedule. Such scheduling is useful particularly when the variation in materials is small and contributes to an improvement in the productivity, because the same final depth can be repeatedly utilized until the next angle measurement.

Reference is made to the flow chart of FIG. 9 for describing the steps of bending of the workpiece W in a case where the selection of the number of bending angle measurements is possible as described earlier.

T1 to T2: A check is made to find whether the measurement mode for measuring the bending angle of the workpiece W during operation is selected in the present bending operation. If the measurement mode is not selected, that is, there is no need to make bending angle measurement, the ram 14 is then lowered for bending operation to the final lower limit position which has been set in the preceding operation and the flow is completed. Note that whether or not bending will be performed in the bending angle measurement mode is set by the operator through an external switch.

T3 to T5: If the measurement mode is selected, the processing condition input section 21 inputs information such as workpiece data (material, the length of a bending line, bending angle, etc.), die data (die height, V-groove width, V-angle, punch R, etc.), machine data (rigidity, speed specification, stroke specification, etc.). After the lengthwise position and setting condition of the angle measuring unit 18 which are bending angle measuring conditions have been set, the NC device 20 is put in operation.

T6 to T7: A check is made to judge whether or not the teaching mode is selected and if not, the workpiece W is set in place.

T8 to T11: It is judged whether the number of bending angle measurements to be made is one or two, and if it is one, a provisional target lower limit position (the depth of an angle measuring point) $D_{ppn}$ for the ram 14 is calculated from the foregoing equation (a) and the upper die 15 is lowered to the provisional target lower limit position to perform bending. Bending angle measurement is carried out by the angle measuring unit 18 at the provisional target lower limit position and the result of the measurement is displayed.

T12 to T15: A check is made to judge whether the following relation holds.

measured angle<target bending angle–springback angle+constant
(e.g., the value of tolerance)

In other words, it is judged whether or not the target drive angle has been reached. If it is found from the judgment that the target drive angle has not been reached, a final lower limit value (final depth) $D_{ptn}$ for the ram 14 is then obtained from the forgoing equation (b) to update the final lower limit value of the presiding data. With the update final lower limit value, bending operation is performed. On the other hand, if the target drive angle has been reached, $D_{ppn}$ is determined as the final lower limit value for the present operation to update the final lower limit value of the presiding data.

T16 to T21: If the number of bending angle measurements to be made is two, a provisional target lower limit position (depth) $D_{pp1}$ for the ram 14 at the first angle measuring point is calculated from the foregoing equation (c) and the upper die 15 is then lowered to the calculated target lower limit position to perform bending. Bending angle measurement is then made by the angle measuring unit 18 at this provisional target lower limit position and the result of the measurement is displayed. Similarly, a provisional target lower limit position (depth) $D_{pp2}$ for the ram 14 at the second angle measuring point is calculated from the foregoing equation (d). The upper die 15 is then lowered to the calculated target lower limit position to perform bending. The angle measuring unit 18 carries out angle measurement at this provisional target lower limit position and the result of the measurement is displayed.

T22 to T25: A check is made to judge whether the following relation holds.

measured angle<target bending angle–springback angle+constant
(e.g., the value of tolerance)

In other words, it is judged whether or not the target drive angle has been reached. If it is found from the judgment that the target drive angle has not been reached, a final lower limit value (final depth) $D_{ptb}$ for the ram 14 is calculated from the foregoing equation (e) to update the final lower limit value of the previous data and with this update final lower limit value, bending is performed. On the other hand, if the target drive angle has been reached, $D_{pp2}$ is determined as the final lower limit value for the present operation to update the previous data.

As the steps T26 to T39 are similar to the steps S13 to S26 of the flow chart shown in FIG. 3, a detailed explanation on these steps will be omitted.

Next, there will be explained how to obtain the relationship between the bending angle and the driving amount from bending angle measurement data in the bending angle vs. driving amount data updating section 28 and how to estimate the final driving amount for the ram 14 from the obtained relationship. There are two procedures for obtaining the relationship between the bending angle and the driving amount: One is to obtain it newly and directly from measurement data and the other is to correct a formula already entered.

(1) The procedure for obtaining the relationship between the bending angle and the driving amount directly from bending angle measurement data:

In this procedure, bending angle measurement is first made several times during bending of a workpiece made from specified material and the data on the relationship between the bending angle and the driving amount (this amount is herein represented by depth) as shown in FIG. 10 is obtained from the measured angles. According to the measurement data thus obtained, an appropriate computing format is selected from several kind, of formats which have been preliminarily prepared. This computing format is a relational arithmetic expression (i.e., approximate arithmetic expression) representing the bending angle versus the driving amount. Table 1 shows one example of the approximate arithmetic expression table to be registered. In the example shown in Table 1, the coefficients X, Y, Z of the computing format: $D_p=XA^2+YA+Z$ are obtained from the measurement data, whereby the relationship between the bending angle and the driving amount can be quantified.

TABLE 1

| Material | Sheet Thickness | Die No. | | | | Arithmetic Expression | | | |
| | | Die | Punch | Die Holder | Punch Holder | Computing Format | X | Y | Z |
|---|---|---|---|---|---|---|---|---|---|
| SVS304 | 1.5 | 1 | 2 | 1 | 2 | Dp = XA² + YA + Z | | | |

Based on the relationship between the bending angle and the driving amount thus obtained and on the relationship between the target bending angle and the springback angle which has been preliminarily entered, the final drive end (i.e., final depth) for the ram 14 is obtained in the way described earlier (see Equations (a) to (h)).

(2) The procedure for obtaining the relationship between the bending angle and the driving amount, using correction coefficients for data already entered:

In this procedure, after bending angle measurement has been made several times during bending operation similarly to the procedure (1) to obtain data on the bending angle versus the driving amount, an appropriate computing format is selected. The computing format in this procedure is a relational arithmetic expression (i.e., approximate arithmetic expression) for obtaining a correction value for the relationship between the bending angle and the driving amount. More concretely, it is a correction formula for an arithmetic expression already entered in the NC device. Table 2 shows one example of the correction formula table to be stored. In the example shown in Table 2, the coefficients l, m, n of the computing format: C 32 $lA^2+mA+n$ are obtained from the measurement data, whereby the relationship between the correction value and the bending angle vs. the driving amount can be quantified. FIG. 11 shows the relationship between the previous computed value (indicated by solid line) stored in the NC device and the computed value based on angle measurement, while FIG. 12 shows the relationship between the bending angle and the correction value.

According to this procedure, the final lower limit value for the ram 14 is obtained in the following way (see the graph of FIG. 13).

First, bending is performed by driving the ram 14 to a provisional drive end $D_{pp}$ at which angle measurement is made to obtain a measured angle FA. A true depth $D_0$ which corresponds to the measured angle FA is obtained from $$D_0=d_0+c_0$$

where $d_0$ is the computed depth for an angle measuring point according to the previous data stored in the NC device and co is the correction amount for the depth for an angle measuring point.

Then, the true depth $D_1$ for the point WA—SB (target bending angle–springback angle) in the bending angle vs. driving amount curve is obtained from the following equation, making reference to the springback table.

$$D_1=d_1+c_1$$

Here, $d_1$ is the computed depth for the point WA–SB according to the previous data stored in the NC device and c is the correction amount for the depth for the point WA–SB.

Finally, a final depth (i.e., final lower limit value) $D_{pt}$ is obtained from the following equation:

$$D_{pt}=D_{pp}-(D_0-D_1)=D_{pp}-(d_0+c_0-d_1-c_1)$$

The flow of an updating process for the ending angle vs. the driving amount data will be explained with reference to the flow chart of FIG. 14. In this process, a sample workpiece is used.

U1 to U4: Processing conditions such as workpiece data, die data, machine data and product data as well as measuring conditions such as the bending angle at an angle measuring point and the number of measurements to be made are set. A lower limit value for the first bending operation is set. Thereafter, the workpiece W is placed between the upper die 15 and the lower die 13.

U5 to U8: Bending is carried out with the upper and lower dies 15, 13. Bending angle measurement is made and the result of the measurement is stored in the memory means.

TABLE 2

| Material | Sheet Thickness | Die No. | | | | Arithmetic Expression | | | |
| | | Die | Punch | Die Holder | Punch Holder | Computing Format | l | m | n |
|---|---|---|---|---|---|---|---|---|---|
| SVS304 | 1.5 | 1 | 2 | 1 | 2 | C = lA² + mA + n Correction Value | | | |

After that, if the number of angle measurements has not reached a preset number, the lower limit value is changed to the next value and then, the flow returns to the step U5.

U9: If the number of angle measurements has reached the preset number, an appropriate computing format is selected from preliminarily prepared computing formats associated with the relationship between the bending angle and the driving amount.

U10 to U13: If the relationship between the bending angle and the driving amount is obtained by the direct procedure described earlier, the coefficients of the relational arithmetic expression of the bending angle vs. the driving amount is obtained and quantified. On the other hand, if it is not obtained by the direct procedure but obtained through correction of a previous computed value, the coefficients of the relational arithmetic expression of a correction value for the bending angle vs. the driving amount is obtained and quantified. In both cases, the obtained data is entered in the table as a data base.

Referring to the flow chart of FIG. 15, the flow of an updating process for the springback data will be described below. In this updating process, a sample workpiece is also used.

V1: A check is made to judge if a load monitor for detecting the unloading condition of the workpiece W indicates "unloading" and if not, the step V2 and later steps are executed. If the load monitor indicates "unloading", the step V14 and later steps are then executed.

V2 to V4: The processing conditions such as workpiece data, die data, machine data are input through the processing condition input section 21 and then, the bending angle measuring conditions such as the lengthwise position and setting condition of the angle measuring unit 18 are set. From the processing conditions etc., the lower limit position for the ram 14 which corresponds to the first value of the bending angle of the workpiece W is obtained.

V5 to V10: The workpiece W is placed between the upper die 15 and the lower die 13 and the upper die 15 is lowered to the lower limit position to execute bending. At this lower limit position, bending angle measurement is made by the angle measuring unit 18 and the result of the measurement is displayed. Sequentially, the ram 14 is lifted to a specified position at which bending angle measurement is again made, displaying its result. Thereafter, the springback angle corresponding to the target bending angle obtained from the results of the bending angle measurements is once stored.

V11: If the number of measurements has not reached a preset number, the flow returns to the step V5.

V12 to V13: If the number of measurements has reached the preset number on the other hand, a check is then made to judge if measurements have been completed for all the target bending angles. If not, the lower limit guide value for the ram 14 which corresponds to the next target bending angle is computed and the flow returns to the step V5. If all the target bending angles have been measured, the flow proceeds to the step V26.

V14 to V19: If the load monitor indicates "unloading", the steps V2 to V7 are executed similarly to the case where "unloading" is not indicated.

V20 to V22: The ram 14 is lifted until the load detected by the load monitor becomes equal to a specified value, and bending angle measurement is again made at this lifting position, displaying the result of the measurement. Thereafter, the springback angle corresponding to the target bending angle obtained from the results of the bending angle measurements is once stored.

V23 to V24: If measurements have not been completed for all the target bending angles, the lower limit value for the ram 14 which corresponds to the next target bending angle is computed and the flow returns to the step V18.

V25: If measurements have been completed for all the target bending angles, a check is then made to determine if the number of measurements have reached a specified number. If it has not reached, the flow returns to the step V16 and if it has reached, the flow proceeds to the step V26.

V26 to V27: The coefficients of the approximate arithmetic expression used for computing the springback angle are obtained and this data is entered in the table as a data base.

If the load monitor does not indicate "unloading", data on one target bending angle is obtained from one sample workpiece in the steps V5 to V11. If the load monitor indicates "unloading", data on a plurality of target bending angles can be obtained from one sample workpiece in the steps 17 to 25. It should be noted that automatic execution of the steps V17 to V25 is possible in the case of "unloading".

Table 3 shows one example of the springback angle table to be stored. As seen from Table 3, the springback angle is entered and updated in accordance with factors such as material, sheet thickness, the V-width of the die, punch R and the target bending angle.

TABLE 3

| Sheet | | | | Target Bending Angle | | |
|---|---|---|---|---|---|---|
| Material | Thickness | V-Width | Punch R | 90° | 120° | 150° |
| SVS430 | 1.0 | 10 | 5 | | | |

While the foregoing embodiment has been particularly described with a bending angle measuring device which comprises a slit-like light source and a CCD camera for picking up a linear projected light image formed by the light source and which utilizes image processing for measuring the bending angle, the invention is not limitative to such a bending angle measuring device but may use a wide variety of systems. For example, it is possible to use a system in which a plurality of distance sensors (e.g., eddy current sensors and electrical capacitance sensors) are employed to measure the distance from each sensor to the workpiece and the differences between the measured distances are obtained thereby detecting the bending angle. Also, use of a contact-type measuring device is conceivable.

While the invention is applied to a press brake of the so-called over-drive type in which the upper die is driven with the lower die being stationary and the lower limit value for the ram carrying the upper die is corrected in the foregoing embodiment, the invention is applicable to a press brake of the so-called under-drive type in which the lower die is driven with the upper die being stationary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A press brake for bending a workpiece with an upper die and a lower die that is arranged in opposing relationship with the upper die, the press brake comprising:
   (a) memory means for storing information including (i) processing conditions for the workpiece, (ii) a relationship between a target bending angle for the workpiece and a springback angle of the workpiece and (iii) a relationship between a bending angle of the workpiece and an amount of driving a moveable one of the upper and lower dies;

(b) bending angle measuring means for measuring the bending angles of the workpiece during a bending process;

(c) drive end computing means for computing a provisional drive end for the movable die based on said information stored in said memory means and for computing a final drive end for the movable die based on the bending angle of the workpiece measured at the provisional drive end by said bending angle measuring means and based on said information stored in said memory means; and (d) die driving means for driving the movable die to the final drive end after driving the movable die to the provisional drive end.

2. A press brake for bending a workpiece with an upper die and a lower die that is arranged in opposing relationship with the upper die, the press brake comprising:

(a) memory means for storing information including (i) processing conditions for the workpiece, (ii) a relationship between a target bending for the workpiece and a springback angle of the workpiece, and (iii) a relationship between a bending angle of the workpiece and an amount of driving a movable one of the upper and lower dies, (iv) a preset final drive end for the movable die, and (v) an angle measuring point indication value indicating at what angle the bending angle of the workpiece is to be measured before a target drive angle is reached;

(b) bending angle measuring means for measuring the bending angles of the workpiece during a bending process;

(c) drive end computing means
for computing the target drive angle based on the processing conditions for the workpiece and the relationship between the target bending angle for the workpiece and the springback angle of the workpiece, said pieces of information being stored in the memory means,
for computing a provisional drive end for the movable die based on the target drive angle, the angle measuring point indication value, the preset final drive end and the relationship between the bending angle of the workpiece and the driving amount for the movable die, and
for computing a final drive end for the movable die based on the bending angle of the workpiece measured at the provisional drive end by the bending angle measuring means, the relationship between the target bending a angle for the workpiece and the springback angle of the workpiece and the relationship between the bending angle of the workpiece and the driving amount for the movable die; and (d) die driving means for driving the movable die to the final drive end after driving the movable die to the provisional drive end.

3. A press brake according to claim 1 or 2, further comprising springback data updating means for updating data on the relationship between the target bending angle for the workpiece and the springback angle of the workpiece in accordance with actual measurement data obtained by measuring the bending angle of the workpiece by the bending angle measuring means.

4. A press brake according to claim 1 or 2, further comprising bending angle vs. driving amount data updating means for updating data on the relationship between the bending angle of the workpiece and the driving amount for the movable die according to actual measurement data obtained by measuring the bending angle of the workpiece by the bending angle measuring means.

5. A press brake according to claim 4, wherein said bending angle vs. driving amount data updating means directly computes update data on the relationship between the bending angle of the workpiece and the driving amount for the movable die from an approximation that is obtained based on the actual measurement data of the bending angle obtained by the bending angle measuring means.

6. A press brake according to claim 4, wherein said bending angle vs. driving amount data updating means obtains update data on the relationship between the bending angle of the workpiece and the driving amount for the movable die by correcting an approximation which has been preliminarily entered in the memory means, based on the actual measurement data of the bending angle obtained by the bending angle measuring means.

7. A press brake according to claim 1 or 2, wherein the provisional drive end for the movable die is a position at which the movable die comes in contact with the workpiece and wherein the die driving means is manually movable from said contact position to the final drive end.

8. A press brake according to claim 1 or 2, wherein said bending angle measuring means measures the bending angle of the workpiece after completion of bending operation, thereby confirming bending accuracy and wherein the final drive end for the movable die is adjusted according to the confirmed bending accuracy.

9. A press brake according to claim 2, further comprising input means for inputting said angle measuring point indication value.

10. A press brake according to claim 2, wherein when a plurality of workpieces of the same shape are bent sequentially in the same material lot or in different material lots having less variations in their properties, said drive end computing means for determining said preset final drive end is at the final drive end which has been determined in the preceding operation in cases where the bending operation involves a single step and for determining said preset final drive end is the final drive end which has been determined in the same step in the preceding operation in cases where the bending operation involves a plurality of steps.

11. A press brake according to claim 2, wherein when bending of the workpiece is performed for the first time, said drive end computing means for calculating said preset final drive end from the processing conditions for the workpiece.

12. A press brake according to claim 2, wherein when changing bending operation from a first material lot to a second material lot in cases where a plurality of workpieces of the same shape are sequentially bent, said drive end computing means for determining said preset final drive end is the final drive end which has been determined in the last operation for the first material lot in cases where the bending operation involves a single step and for determining said preset final drive end is the final drive end which has been determined in the same step in the last operation for the first material lot in cases where the bending operation involves a plurality of steps.

13. A press brake according to claim 11 or 12, wherein said drive end computing means for determining said provisional drive end in one bending operation consists of a first provisional drive end and a second provisional drive end and wherein said angle measuring point indication value being stored in said memory means as a first angle measuring point indication value and a second angle measuring point indication value.

14. A press brake according to claim 13, further comprising input means for inputting the first and second angle measuring point indication values.

15. A press brake according to claim 13, wherein said first provisional drive end is calculated based on the preset final drive end whereas the second provisional drive end is calculated based on the first provisional drive end.

16. A press brake according to claim 2, further comprising preset final drive end updating means for updating the preset final drive end whenever bending operation is performed on a new workpiece having the same shape as that of the workpiece in the preceding operation.

17. A press brake according to claim 2, further comprising a bending angle measurements setting means for setting the number of measurements to be made to two, one or zero, wherein the number of measurements includes measuring the bending angle of the workpiece by the bending angle measuring means during one bending operation.

* * * * *